United States Patent
Li et al.

(10) Patent No.: US 11,794,297 B2
(45) Date of Patent: *Oct. 24, 2023

(54) INTERNAL COOLING/EXTERNAL COOLING-SWITCHING MILLING MINIMUM-QUANTITY-LUBRICATION INTELLIGENT NOZZLE SYSTEM AND METHOD

(71) Applicants: QINGDAO UNIVERSITY OF TECHNOLOGY, Shandong (CN); SHANGHAI JINZHAO ENERGY SAVING TECHNOLOGY CO., LTD., Shanghai (CN); SHANXI JINZHAO AVIATION TECHNOLOGY CO., LTD., Shanxi (CN)

(72) Inventors: Changhe Li, Qingdao (CN); Xifeng Wu, Qingdao (CN); Yixue Han, Qingdao (CN); Naiqing Zhang, Qingdao (CN); Yanbin Zhang, Qingdao (CN); Qidong Wu, Qingdao (CN); Huajun Cao, Qingdao (CN); Teng Gao, Qingdao (CN); Min Yang, Qingdao (CN); Bingheng Lu, Qingdao (CN); Yuying Yang, Qingdao (CN); Xin Cui, Qingdao (CN); Xufeng Zhao, Qingdao (CN); Mingzheng Liu, Qingdao (CN); Dongzhou Jia, Qingdao (CN); Xiaowei Zhang, Qingdao (CN); Hao Ma, Qingdao (CN)

(73) Assignees: QINGDAO UNIVERSITY OF TECHNOLOGY, Qingdao (CN); SHANGHAI JINZHAO ENERGY SAVING TECHNOLOGY CO., LTD, Shanghai (CN); SHANXI JINZHAO AVIATION TECHNOLOGY CO., LTD., Xi'an (CN)

( * ) Notice: Subject to any disclaimer, the term of this patent is extended or adjusted under 35 U.S.C. 154(b) by 257 days.

This patent is subject to a terminal disclaimer.

(21) Appl. No.: 17/341,326

(22) Filed: Jun. 7, 2021

(65) Prior Publication Data

US 2022/0143769 A1 May 12, 2022

(30) Foreign Application Priority Data

Nov. 9, 2020 (CN) .......................... 2020112401605

(51) Int. Cl.
B23Q 11/10 (2006.01)
B23C 5/28 (2006.01)
B23Q 17/24 (2006.01)

(52) U.S. Cl.
CPC ............... B23Q 11/10 (2013.01); B23C 5/28 (2013.01); B23Q 11/1015 (2013.01); B23Q 11/1046 (2013.01); B23Q 17/249 (2013.01)

(58) Field of Classification Search
CPC .............. B23Q 11/1046; B23Q 17/249; B23Q 11/1015; B23Q 11/1076; B23C 2250/12
See application file for complete search history.

(56) References Cited

U.S. PATENT DOCUMENTS

| 3,718,757 | A | * | 2/1973 | Gulitz | ............... | G01J 5/025 |
| | | | | | | 117/203 |
| 2006/0283667 | A1 | * | 12/2006 | Piana | ............... | B23Q 11/1076 |
| | | | | | | 184/6.14 |

(Continued)

FOREIGN PATENT DOCUMENTS

KR 20130142478 A * 12/2013 ........... B23Q 17/249

OTHER PUBLICATIONS

English machine translation of KR 20130142478 A (Year: 2013).*

*Primary Examiner* — Alan Snyder
(74) *Attorney, Agent, or Firm* — True Shepherd LLC; Andrew C. Cheng

(57) ABSTRACT

The present disclosure provides an internal cooling/external cooling-switching milling minimum-quantity-lubrication intelligent nozzle system and method, relating to the field of milling lubrication. The system includes: a vision system, configured to acquire a real-time milling depth of a workpiece and send the real-time milling depth to a lubrication manner controller for processing; a lubrication system, including an internal cooling system and an external cooling system connected together to a cutting fluid supply source through a reversing device; and the lubrication manner controller, configured to communicate with the vision sys- (Continued)

tem and the lubrication system respectively, and control the reversing device to act according to a set milling depth threshold and data acquired by the vision system, so as to adjust and switch to the internal cooling system or the external cooling system to work. Milling depth data of a machine tool is collected, the milling depth data is transmitted to a control center for data analysis and processing, the data is compared with an initially set internal cooling/ external cooling switching threshold to obtain the most suitable cooling and lubrication manner under current machining conditions of the machine tool, and the control center controls the internal cooling and external cooling systems according to the obtained result to realize intelligent switching of the cooling and lubrication manner between internal cooling and external cooling.

10 Claims, 11 Drawing Sheets

(56) References Cited

U.S. PATENT DOCUMENTS

| | | | |
|---|---|---|---|
| 2016/0236351 A1* | 8/2016 | Kunihiro | B25J 9/1697 |
| 2019/0118323 A1* | 4/2019 | Koshiishi | B23Q 11/1015 |
| 2019/0118324 A1* | 4/2019 | Fujii | B23Q 11/0075 |
| 2019/0217434 A1* | 7/2019 | Adachi | B23Q 11/0003 |

* cited by examiner

INTERNAL COOLING/EXTERNAL COOLING-SWITCHING MILLING MINIMUM-QUANTITY-LUBRICATION INTELLIGENT NOZZLE SYSTEM AND METHOD

BACKGROUND

Technical Field

The present disclosure relates to the field of milling lubrication, and in particular to an internal cooling/external cooling-switching milling minimum-quantity-lubrication intelligent nozzle system and method.

Related Art

The description in this section merely provides background information related to the present disclosure, and does not necessarily constitute the prior art.

In machining, the cooling and lubrication manners used at the milling machine machining center include internal cooling and external cooling. In the cooling and lubrication manner of internal cooling, generally, the cutting fluid is supplied by a cutting fluid supply system, flows into a rotary joint of a machine tool spindle through a cutting fluid pipe, and flows into an internal cooling pipe of the machine tool spindle from the rotary joint. The cutting fluid is transmitted to an internal cooling pipe in a cutting tool to realize cooling and lubrication of the cutting tool in the cutting machining process. The cooling and lubrication manner of internal cooling can satisfy the cooling and lubrication under machining conditions such as holes and grooves of a large milling depth. But it has the disadvantage that it is only suitable for cutting machining under specific machining conditions, and because an internal cooling system is a built-in system in the machine tool, the price is higher, and it will cause economic waste under the machining conditions where internal cooling is not required. The cooling and lubrication manner of external cooling includes pouring and minimum quantity lubrication (MQL) technique. For the pouring, generally, the cutting fluid is supplied by a cutting fluid supply system, and flows into an external cooling nozzle through an external cooling pipe, so as to perform cooling and lubrication on a cutting tool-a machining region of a workpiece from the outside. This manner of cooling and lubrication can effectively cool and lubricate the machining region, and can also perform functions of chip removal and cutting tool cleaning. Compared with the cooling and lubrication manner of internal cooling, the cooling and lubrication manner of pouring cannot satisfy the cooling and lubrication under machining conditions such as holes and grooves of a large milling depth. In addition, in this manner, the cooling and lubrication efficiency of the cutting fluid is very low, so a large amount of cutting fluid is wasted. This will not only cause economic losses, but also affect the life and health of operators because the cutting fluid contains substances that are harmful to human health.

Compared with the traditional cooling and lubrication manner of external cooling by pouring, the MQL is more suitable for the concept of green manufacturing and sustainable development in the field of machining. The MQL refers to a technique in which a small amount of lubricating fluid, water and a gas with a certain pressure are mixed and atomized, and then sprayed to the cutting region for cooling and lubrication. The water and the high-pressure gas perform the function of cooling, and oil performs the functions of lubricating the cutting region and prolonging the service life of the cutting tool.

As a green quasi-dry machining technique, the MQL has the following advantages:

(1) As an effective green manufacturing technique, there is no need to replace MQL oil during machining, and it is only required to periodically incorporate, that is, add a small amount of pollution-free lubricating oil into the compressed gas. In the entire operation process, no waste liquid is discharged. The generated oil mist can be directly discharged after being purified by equipment, thereby effectively avoiding the environmental pollution caused by industrial production.

(2) The cutting conditions of the cutting tool are improved, the cutting heat generated in the machining process are suppressed and reduced, and the service life of the cutting tool is prolonged. The cutting fluid is supplied in the form of high-velocity mist particles, thereby increasing the permeability of the lubricant, enhancing the cooling and lubrication effect, and improving the surface machining quality of the workpiece.

(3) By implementing the MQL technique, the consumption of the lubricating medium is extremely low. In normal cases, the consumption per hour is only 0.05-0.1 L. In contrast, the consumption of emulsion per hour in traditional wet machining is about 1000 L, and the actual consumption of cutting fluid in the former is only one ten thousandth of that in the traditional case, so the cost of coolant is greatly reduced.

MQL supply systems can be roughly classified into two categories, single-channel type and double-channel type. The difference between the two is that air and lubricating oil are mixed to form aerosols at different positions, that is, the MQL supply systems are classified into two forms according to the differences in transmission and atomization of the small amount of cutting fluid. The characteristic of the single-channel type is that: air and lubricating oil have been mixed to form an aerosol in the generating equipment, and then the aerosol is delivered to the machining region through a track inside the nozzle. The characteristic of the double-channel type is that: air and lubricating oil are delivered to a mixing cavity near the machining spindle nose in different tracks to form an aerosol, and the aerosol is then delivered to the machining region. Compared with the double-channel system, although the single-channel system is easier to manufacture, oil mist is easily dispersed when the cooling and lubricating mist is delivered, especially in a rotating spindle with strong centrifugal action, which often leads to uneven distribution of oil mist in the machining region, thereby affecting the machining quality. However, in the double-channel type MQL system, because after the aerosol is formed, the distance of its delivery to the machining region is shorter, the lubricating droplets are smaller than those in the single-channel type system, and the lubricating effect is better, so the application range is wider. The MQL technique has higher cutting fluid utilization rate and less environmental pollution. However, as with the pouring, the MQL technique still has the problem of insufficient cooling and lubrication for the machining region under conditions such as when machining holes and grooves of a large milling depth. For the improvement of the cooling and lubrication manners of internal cooling and external cooling, researchers have made great progress, but there are still many deficiencies in application.

Although the existing devices have made outstanding contributions in the aspects of resource saving, lubrication performance and the like, when workpieces with holes of a large depth and with grooves of a small depth are simultaneously machined on the machine tool, the external cooling still has the problem of insufficient cooling and lubrication. The use of the internal cooling machine tool is not cost effective. The researchers thought that by changing the tool holder structure of the cutting tool, external cooling can be converted into internal cooling while keeping the original external cooling and lubrication mechanism unchanged. When the actual machining conditions require the internal cooling and lubrication manner, external cooling can be converted into internal cooling by transforming the tool holder, so that the machine tool has the cooling and lubrication manner of internal cooling while maintaining external cooling, thereby satisfying the demands for actual machining conditions. Researchers have now conducted research in this aspect and have achieved remarkable results.

At present, the cooling and lubrication manner of external cooling has been transformed to the cooling and lubrication manner of internal cooling, so that the machine tool has the cooling and lubrication manners of both internal cooling and external cooling, and can realize the transformation between external cooling and internal cooling by a special structure, thereby satisfying the demands for machining workpieces with holes and grooves of a large depth, and also satisfying the demands for machining workpieces with holes of a small depth or with flat surfaces. However, in the actual machining of a machine tool, the operator needs to judge which cooling and lubrication manner is needed for the machining conditions at this time based on his own experience before transforming the cooling and lubrication manner between internal cooling and external cooling, so there are large limitations. Furthermore, these inventions need manual operation in transforming the cooling and lubrication manner between internal cooling and external cooling, failing in intelligent switching between internal cooling and external cooling, thereby wasting lots of human resources.

SUMMARY

In view of the defects in the prior art, the present disclosure provides an internal cooling/external cooling-switching milling MQL intelligent nozzle system and method.

Milling depth data of a machine tool is collected; the milling depth data is transmitted to a control center for data analysis and processing; the data is compared with an initially set internal cooling/external cooling switching threshold to obtain the most suitable cooling and lubrication manner under current machining conditions of the machine tool; and the control center controls internal cooling and external cooling systems according to the obtained result to realize intelligent switching of the cooling and lubrication manner between internal cooling and external cooling.

A first objective of the present disclosure is to provide an internal cooling/external cooling-switching milling MQL intelligent nozzle system, which adopts the following technical solution:

The system includes:
  a vision system, configured to acquire a real-time milling depth of a workpiece and send the real-time milling depth to a lubrication manner controller for processing;
  a lubrication system, including an internal cooling system and an external cooling system connected together to a cutting fluid supply source through a reversing device; and
  the lubrication manner controller, configured to communicate with the vision system and the lubrication system respectively, and control the reversing device to act according to a set milling depth threshold and data acquired by the vision system, so as to adjust and switch to the internal cooling system or the external cooling system to work.

When the external cooling system works, droplets sprayed from a nozzle device of the external cooling system impact a heat source surface and spread to form a liquid film along the heat source surface.

Further, the vision system includes an image collection device and a cradle head; the image collection device is mounted on the self-stabilizing cradle head; and the image collection device is configured to be mounted on a machine tool and acquire a real-time milling depth image of the workpiece.

Further, the reversing device includes a reversing base; a reversing channel is arranged inside the reversing base; an inlet of the reversing channel is butted with the cutting fluid supply source through a pipeline; a first outlet of the reversing channel communicates with the internal cooling system; a second outlet of the reversing channel communicates with the external cooling system; a reversing block is mounted in the reversing channel; and the reversing block is capable of blocking the first outlet and/or the second outlet by rotation.

Further, the reversing base is provided with a pressure regulating structure and a pressure relieving structure, and both the pressure regulating structure and the pressure relieving structure communicate with the reversing channel.

Further, the external cooling system includes the nozzle device, a telescopic arm module and a nozzle angle module; the nozzle device is mounted on the telescopic arm module through the nozzle angle module; and the nozzle device is capable of changing a relative position to the workpiece through the telescopic arm module and changing a direction of an output end of the nozzle device through the nozzle angle module.

Further, the telescopic arm module includes a telescopic arm support, an X-axis action arm, a Y-axis action arm and a Z-axis action arm; the X-axis action arm is mounted on the telescopic arm support through the Z-axis action arm; the Y-axis action arm is mounted on the telescopic arm support; and the nozzle angle module is mounted at an output end of the Y-axis action arm by magnetic force.

Further, the nozzle device includes a gas pipe, a liquid pipe and a gas-liquid pipe; one end of the gas pipe communicates with a gas source, and the other end communicates with the gas-liquid pipe with an axis forming a set included angle with an axis of the gas-liquid pipe; one end of the liquid pipe communicates with the cutting fluid supply source through the reversing device, and the other end is coaxially butted with the gas-liquid pipe; a gas-liquid mixing cavity is formed inside the gas-liquid pipe, and the gas-liquid mixing cavity communicates with the outside through an opening at one end of the gas-liquid pipe away from the liquid pipe.

Further, the nozzle angle module includes a first rotation module and a second rotation module; the nozzle device is mounted at an output end of the second rotation module; the second rotation module is mounted at an output end of the first rotation module; and the nozzle angle module is configured to change the direction of the output end of the nozzle device, so as to enable the droplets sprayed from the nozzle device to impact the heat source surface and spread to form the liquid film along the heat source surface.

A second objective of the present disclosure is to provide an internal cooling/external cooling-switching milling MQL method using the internal cooling/external cooling-switching milling MQL intelligent nozzle system as described above, which includes the following steps:

The method includes the following steps:

acquiring, by a vision system, a real-time milling depth image of a workpiece and transmitting the real-time milling depth image to a lubrication manner controller for processing;

determining a lubrication manner under current conditions and controlling a reversing device to act according to a set milling depth threshold of the lubrication manner controller to make an internal cooling system or an external cooling system work;

delivering, by the internal cooling system, a lubricating fluid to an internal cooling pipe of a cutting tool for cyclic heat transfer to realize cooling and lubrication; and mixing, by the external cooling system, the lubricating fluid with a gas, and spraying the mixture to a machining position of the workpiece through a nozzle device to realize cooling and lubrication.

Further, droplets output from the external cooling system impact a heat source surface and spread to form a liquid film along the heat source surface to perform heat transfer on the heat source surface.

Compared with the prior art, the present disclosure has the following advantages and beneficial effects:

(1) The milling depth data of the machine tool is collected; the milling depth data is transmitted to the control center for data analysis and processing; the data is compared with the initially set internal cooling/external cooling switching threshold to obtain the most suitable cooling and lubrication manner under current machining conditions of the machine tool; and the control center controls internal cooling and external cooling systems according to the obtained result to realize intelligent switching of the cooling and lubrication manner between internal cooling and external cooling.

(2) The lubrication manner control center can send a corresponding lubrication manner signal to a motor control center according to the most suitable cooling and lubrication manner under current milling conditions, and the motor control center controls angular rotation of a stepping motor in the reversing device by controlling the number of pulse signals, so as to realize intelligent switching between internal cooling and external cooling.

(3) By regulating a pressure regulating handle 1, a preload of a pressure regulating spring 1 is regulated, so that a cutting fluid pressure at a pressure relieving port, that is, a pressure of an internal cooling channel and an external cooling channel, can be regulated. By regulating a preload of a pressure regulating spring 2, a current pressure of the cutting fluid, that is, an overflow pressure, is regulated. By regulating the overflow pressure, the overflow pressure can be made less than the maximum pressure that the reversing device can withstand, thereby protecting the system.

(4) In the nozzle gas-liquid pipeline of an external cooling mechanism of the system, a detailed mechanical analysis is performed on droplet atomization in the selected nozzle gas-liquid pipeline, and a computational analysis is performed on the effective droplet ratio when the atomized droplets reach the workpiece surface, so that a most suitable nozzle structure is selected.

(5) The telescopic arm module of the external cooling mechanism of the system can realize the positional movement in the directions of X, Y and Z, and the nozzle angle module can realize the angular rotation around the Y-axis and the Z-axis. The switching between internal cooling and external cooling is intelligent, and does not need the operator to manually operate in the working process of the machine tool, thereby greatly saving the labor.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

FIG. 1 is a distribution diagram of a minimum-quantity-lubrication intelligent nozzle system on an internal cooling/external cooling milling machine tool in Embodiments 1 and 2;

FIG. 2 is an overall structural diagram of a vision system in Embodiments 1 and 2;

FIG. 3 a schematic diagram of internal cooling/external cooling intelligent switching in Embodiments 1 and 2;

FIG. 4 is an exploded view of a reversing device in Embodiments 1 and 2;

FIG. 5(*a*) is a front view of the reversing device in Embodiments 1 and 2; FIG. 5(*b*) is a side view of the reversing device in Embodiments 1 and 2; FIG. 5(*c*) is a top view of the reversing device in Embodiments 1 and 2;

FIG. 6 is an internal assembly diagram of the reversing device in Embodiments 1 and 2;

FIG. 7(*a*) is a front view of a reversing block in Embodiments 1 and 2; FIG. 7(*b*) is a side view of the reversing block in Embodiments 1 and 2; FIG. 7(*c*) is a top view of the reversing block in Embodiments 1 and 2;

FIG. 8 is a bottom view of a reversing device upper seat in Embodiments 1 and 2;

FIG. 9 is a top view of a reversing device lower seat in Embodiments 1 and 2;

FIG. 10 is a bottom view of the reversing device lower seat in Embodiments 1 and 2;

FIG. 11 is an overall structural diagram of an external cooling device in Embodiments 1 and 2;

FIG. 12 is a structural diagram of a telescopic arm module in Embodiments 1 and 2;

FIG. 13 is an exploded view of a telescopic arm in Embodiments 1 and 2;

FIG. 14 is an exploded view of a nozzle angle module in Embodiments 1 and 2;

FIG. 15 is an assembly diagram of a nozzle support in Embodiments 1 and 2;

FIG. 16 is an assembly diagram of a nozzle first pedestal left pedestal in Embodiments 1 and 2;

FIG. 17(*a*) is a right view of the nozzle angle module in Embodiments 1 and 2;

FIG. 17(*b*) is a top view of the nozzle angle module in Embodiments 1 and 2;

FIG. 17(*c*) is a front view of the nozzle angle module in Embodiments 1 and 2

FIG. 18 is an assembly diagram of a nozzle device in Embodiments 1 and 2;

FIG. 20(*b*) shows a working state of the reversing device when the reversing block rotates by 90° in Embodiments 1 and 2;

FIG. 20(*c*) shows a working state of the reversing device when the reversing block rotates by 180° in Embodiments 1 and 2;

FIG. 20(*d*) shows a working state of the reversing device when the reversing block rotates by 270° in Embodiments 1 and 2;

FIG. 21(*b*) is a working principle diagram of the reversing device during pressure relieving in Embodiments 1 and 2;

FIG. 21(*c*) is a working principle diagram of the reversing device during overflow in Embodiments 1 and 2;

FIG. 22 (*b*) shows Form II of the nozzle gas-liquid pipeline in Embodiments 1 and 2;

FIG. 22 (*c*) shows Form III of the nozzle gas-liquid pipeline in Embodiments 1 and 2;

Figure 24:
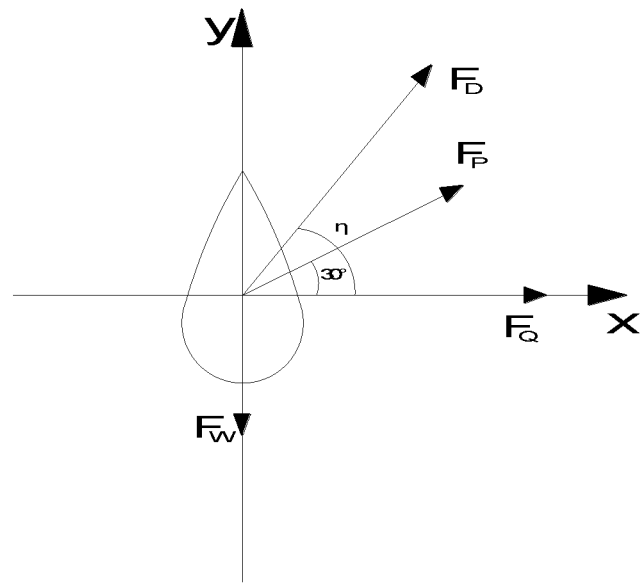
Figure 25:
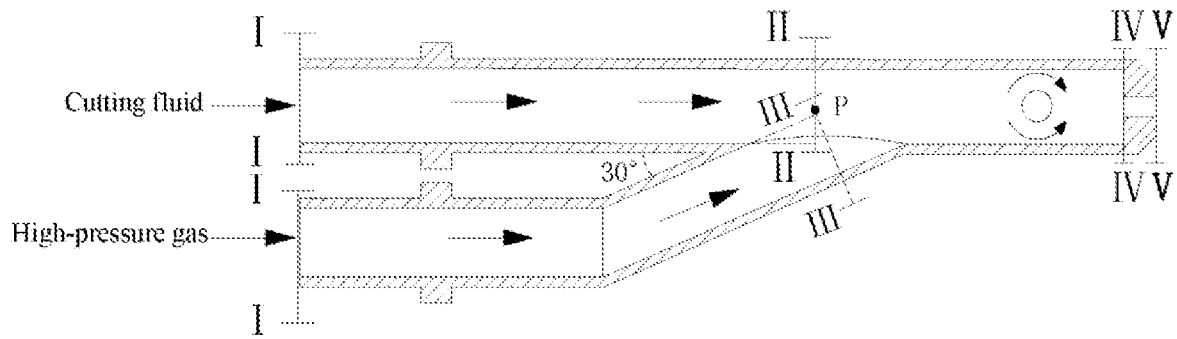
Figure 27:
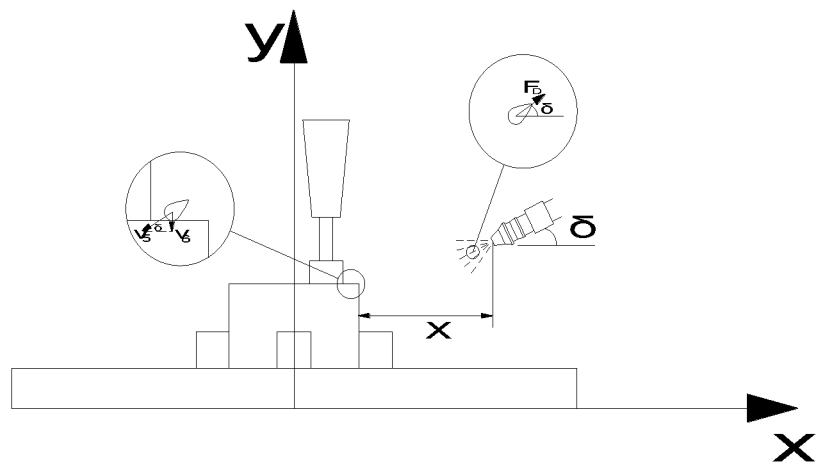
Figure 28:
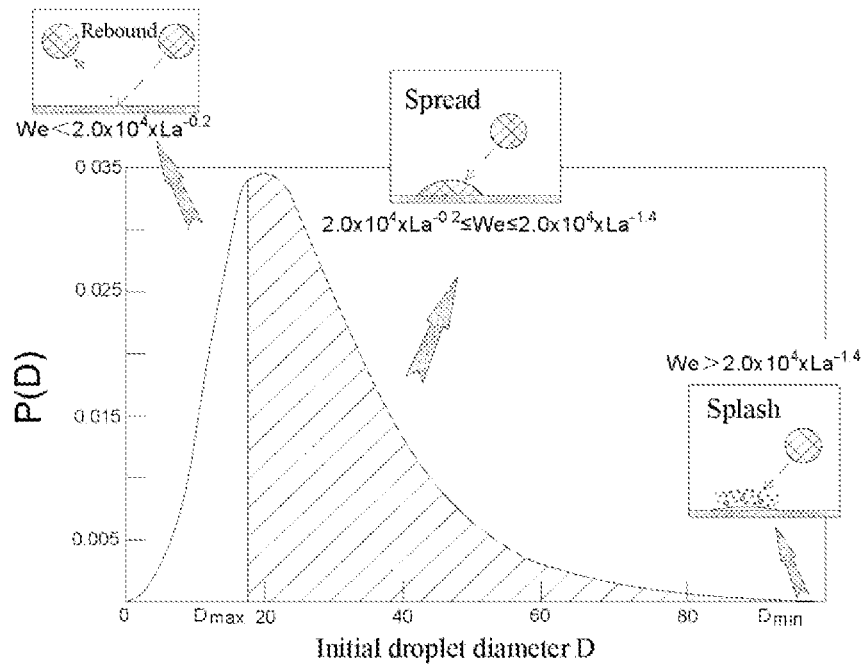

FIG. 24 a force diagram of a cutting fluid droplet in Embodiments 1 and 2;

FIG. 25 is a sectional view of the nozzle gas-liquid pipeline taken based on Bernoulli's equation in Embodiments 1 and 2;

FIG. 26(*a*) is a force analysis diagram of the cutting fluid droplet in Embodiments 1 and 2;

FIG. 26(*b*) is an analysis diagram of the direction of viscous force on the cutting fluid droplet in Embodiments 1 and 2;

FIG. 27 is a diagram showing positional relationship between a nozzle and a workpiece in Embodiments 1 and 2; and FIG. 28 is a probability density distribution diagram of spray droplets in Embodiments 1 and 2.

In the figures, I vision system, II internal cooling system, III external cooling system, II-1 internal cooling and external cooling cutting fluid storage device, II-2 reversing device; III-1 external cooling compressed air storage device.

The vision system includes I-1 camera, I-2 lighting device, I-3 self-stabilizing cradle head, I-4 image collection control center, I-5 image collection control center wireless transmission device, I-6 lubrication manner control center, I-7 lubrication manner control center wireless transmission device, I-8 motor control center, I-9 motor control center wireless transmission device, I-10 support, and I-11 vision system bolt.

II-2-1 reversing device upper seat, II-2-2 reversing device lower seat, II-2-3 reversing block, II-2-4 regulating sleeve 1, II-2-5 regulating sleeve 2, II-2-6 pressure regulating nut 1, II-2-7 pressure regulating nut 2, II-2-8 regulating screw 1, II-2-9 regulating screw 2, II-2-10 spring seat 1, II-2-11 spring seat 2, II-2-12 pressure regulating spring 1, II-2-13 pressure regulating spring 2, II-2-14 spring base 1, II-2-15 spring base 2, II-2-16 valve core 1, II-2-17 valve core 2, II-2-18 reversing motor, II-2-3-1 reversing block bearing, II-2-2-1 reversing device bolt gasket, II-2-2-2 reversing device bolt, II-2-18-1 reversing motor bolt gasket, II-2-18-2 reversing motor bolt, II-2-18-3 reversing motor coupling.

II-2-2-3 reversing device bolt hole, A internal cooling device pipe, B external cooling device pipe, II-2-18-4 reversing motor bolt hole, III-2-1 X, Y, Z telescopic arm module, III-2-2 nozzle angle module, III-2-1-1 X direction telescopic arm, III-2-1-2 Y direction telescopic arm, III-2-1-3 Z direction telescopic arm, III-2-1-4 X and Z direction telescopic arm connector, III-2-1-5 Z and Y direction telescopic arm connector, III-2-1-6 X direction telescopic arm motor, III-2-1-7 Y direction telescopic arm motor, III-2-1-8 Z direction telescopic arm motor, III-2-1-1-1 telescopic arm support, III-2-1-1-2 telescopic arm end cover, III-2-1-1-3 moving slider, III-2-1-1-4 lead screw, III-2-1-1-5 bolt, III-2-1-1-6 coupling, III-2-1-1-7 coupling bolt, III-2-1-1-8 telescopic arm bearing, III-2-1-1-9 support gasket, III-2-1-1-10 support bolt, III-2-2-1 nozzle first pedestal right pedestal, III-2-2-2 nozzle first pedestal left pedestal, III-2-2-3 nozzle second pedestal right pedestal, III-2-2-4 nozzle second pedestal left pedestal, III-2-2-5 nozzle support, III-2-2-6 nozzle device, III-2-2-7 first pedestal motor, III-2-2-8 second pedestal motor, III-2-2-9 nozzle first pedestal bolt, III-2-2-10 nozzle second pedestal bolt, III-2-2-11 first pedestal bearing, III-2-2-12 support bearing, III-2-2-13 first pedestal bolt, III-2-2-14 second pedestal bolt, III-2-2-15 first pedestal coupling, III-2-2-16 second pedestal coupling, III-2-2-6-1 nozzle housing, III-2-2-6-2 nozzle gas-liquid pipeline.

1 cutting fluid storage tank, 2 hydraulic pump, 3 pressure regulating valve, 4 throttle valve, 5 overflow valve, 6 cutting fluid recycling bin, 7 air compressor, 8 filter, 9 gas storage tank, 10 pressure gauge, 11 pressure regulating valve, 12 throttle valve, 13 overflow valve, 14 compressed air recycling bin.

DETAILED DESCRIPTION

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof;

For ease of description, words "up", "down", "left", and "right" appearing in the present disclosure only mean that they are consistent with the up, down, left, and right directions of the drawings themselves, and do not limit the structure. It is for the convenience of describing the present invention and simplifying the description, rather than indicating or implying that the device or element referred to must have a specific orientation, be constructed and operated in a specific orientation, and therefore cannot be understood as a limitation of the present disclosure.

As described in the background art, the transformation of the cooling and lubrication manner between internal cooling and external cooling needs manual operation in the prior art, failing in intelligent switching between internal cooling and external cooling. In view of the above problem, the present disclosure provides an internal cooling/external cooling-switching milling minimum-quantity-lubrication intelligent nozzle system and method.

Embodiment 1

In a typical implementation of the present disclosure, as shown in FIG. 1-FIG. 28, an internal cooling/external cooling-switching milling minimum-quantity-lubrication intelligent nozzle system is provided.

Figure 1:
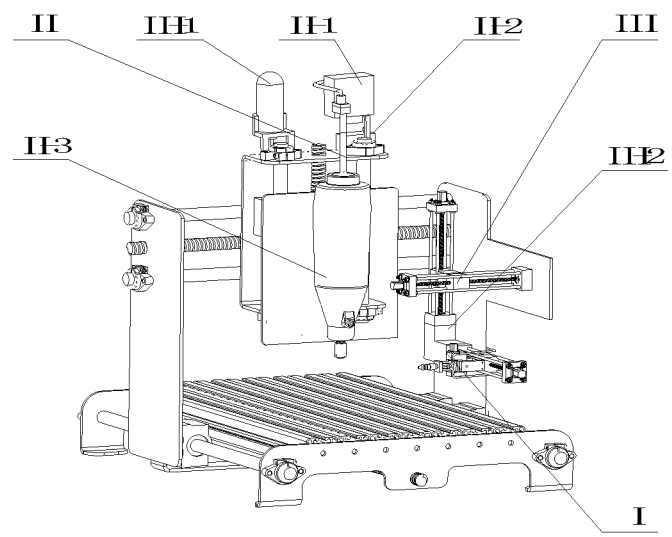

The distribution of the system on a machine tool is shown in FIG. 1. The system includes a vision system I and an external cooling system III.

The vision system I is configured to perform real-time monitoring on a milling state of a cutting tool of the machine tool, collect a real-time milling depth image of a workpiece milled by the cutting tool, and transmit the collected real-time milling depth image of the workpiece milled by the cutting tool to a control system through a wireless transmission device.

Figure 2:
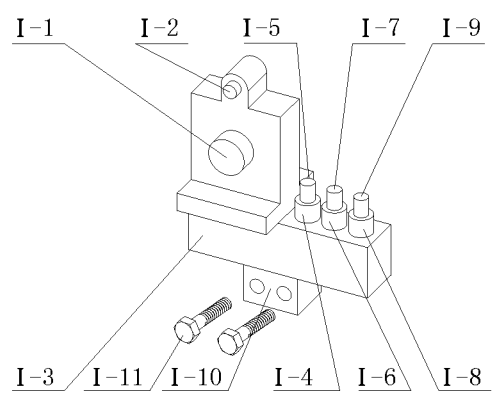

The overall structure of the vision system is shown in FIG. 2. The vision system includes a camera I-1, a lighting device I-2, a self-stabilizing cradle head I-3, an image collection control center I-4 and an image collection control center wireless transmission device I-5. The self-stabilizing cradle head I-3 is further provided with a lubrication manner control center I-6, a lubrication manner control center wireless transmission device I-7, a motor control center I-8, a motor control center wireless transmission device I-9 and a support I-10. The self-stabilizing cradle head I-3 is connected with and mounted on a nozzle second pedestal left pedestal III-2-2-4 through a vision system bolt I-11. On the camera I-1 and the image collection control center I-4, the lighting device I-2 is mounted above the camera I-1, and the image collection control center wireless transmission device I-5 is mounted on the image collection control center I-4.

The camera I-1 is configured to shoot a real-time image of the workpiece milled by the cutting tool, and aims to collect milling depth information of the cutting tool. The lighting device I-2 is configured to illuminate the conditions, and aims to make the image shot by the camera I-1 clearer or to meet the requirements for image shooting under dark conditions. The self-stabilizing cradle head I-3 can automatically adjust an absolute horizontal attitude of the camera I-1, and can realize the high stability of the camera I-1 under a proper swing, so that the camera I-1 always remains relatively stable to a target, thereby ensuring the stability of image shooting. On the one hand, the image collection control center I-4 receives through the image collection control center wireless transmission device I-5 a start shooting instruction sent by the lubrication manner control center I-6, such that the camera I-1 is controlled to shoot the image. On the other hand, the image collection control center is configured to store image information shot by the camera I-1, and the image information is wirelessly transmitted to the lubrication manner control center I-6 via the image collection control center wireless transmission device I-5.

The lubrication manner control center I-6 is mounted on the self-stabilizing cradle head I-3; the lubrication manner control center wireless transmission device I-7 receives the real-time image of the workpiece milled by the cutting tool; and the lubrication manner control center I-6 obtains real-time milling depth data of the cutting tool by analyzing and processing the real-time image of the workpiece milled by the cutting tool. A milling depth threshold for internal cooling/external cooling lubrication manner transformation is set in the lubrication manner control center I-6. The lubrication manner control center I-6 compares the obtained real-time milling depth data of the cutting tool with the set milling depth threshold, obtains the lubrication manner under current machining conditions according to the comparison result, and transmits the result to the motor control center I-8 in the form of an analog semaphore through the lubrication manner control center wireless transmission device I-7.

The motor control center I-8 is mounted on the self-stabilizing cradle head I-3; the motor control center wireless transmission device I-9 receives the analog semaphore containing the lubrication manner required under the current milling conditions sent by the lubrication manner control center I-6; the motor control center I-8 analyzes and processes the analog semaphore; the motor control center wireless transmission device I-9 performs angular regulation on a reversing motor II-2-18 in a reversing device in a manner of controlling the number of pulse signals; and the reversing motor II-2-18 realizes the switching of the cutting fluid flowing to an internal cooling device pipe A or an external cooling device pipe B by controlling the angle of a reversing block II-2-3 in the reversing device II-2, so as to realize the switching between the internal cooling system and the external cooling system, thereby realizing the transformation of the most suitable lubrication manner of the machine tool for the workpiece under the current milling conditions.

The internal cooling system II and the external cooling system III are mechanisms configured to execute internal cooling and external cooling transformation commands sent by the control system. The internal cooling system includes an internal cooling and external cooling cutting fluid storage device II-1, the reversing device II-2 and an internal cooling device II-3. The external cooling system includes the internal cooling and external cooling cutting fluid storage device II-1, an external cooling compressed air storage device III-1, the reversing device II-2 and an external cooling device III-2.

Figure 3:
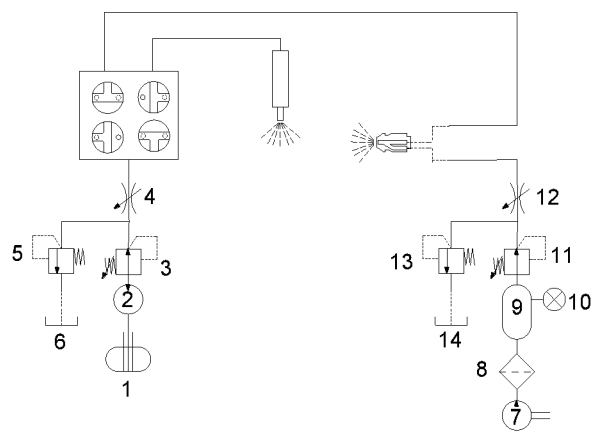

The internal cooling and external cooling cutting fluid storage device II-1 is configured to transport the cutting fluid to the internal cooling device II-3 and the external cooling device III-2 through the reversing device II-2, and the external cooling compressed air storage device III-1 is configured to transmit a compressed gas to the external cooling device III-2 through a pipeline. As shown in FIG. 3, the internal cooling and external cooling cutting fluid storage device II-1 includes a cutting fluid storage tank 1, a hydraulic pump 2, a pressure regulating valve 3, a throttle valve 4, an overflow valve 5 and a cutting fluid recycling bin 6. The external cooling compressed air storage device III-1 includes an air compressor 7, a filter 8, a gas storage tank 9, a pressure gauge 10, a pressure regulating valve 11, a throttle valve 12, an overflow valve 13 and a compressed air recycling bin 14.

Figure 4:
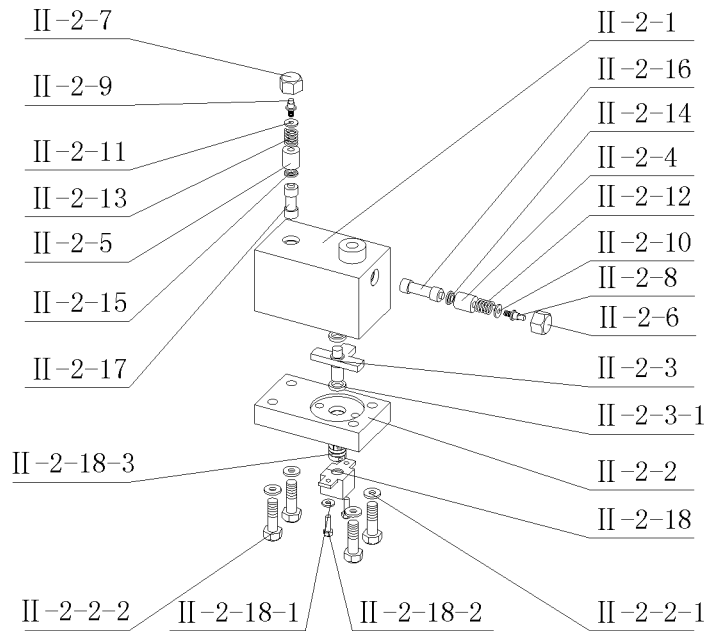
Figure 5A:
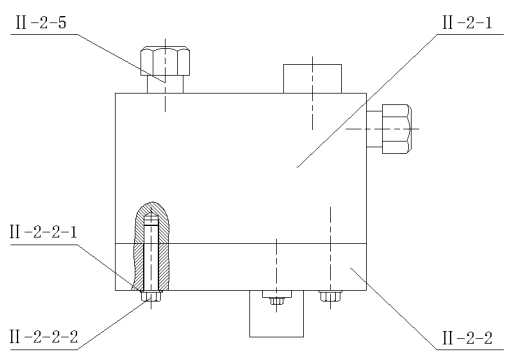
Figure 5B:
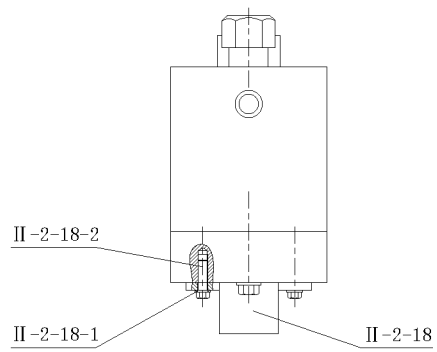
Figure 5C:
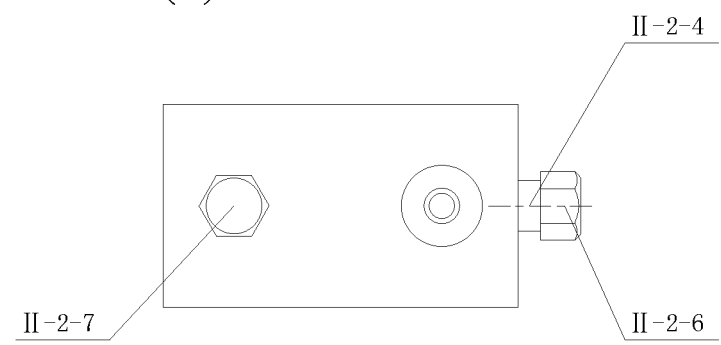

An exploded view of the reversing device II-2 is shown in FIG. 4. The reversing device II-2 is a device used in the internal cooling and external cooling systems to realize the internal cooling and external cooling switching command sent by the control system. The reversing device transmits the cutting fluid from the internal cooling and external cooling cutting fluid storage device II-1 to itself through a pipeline. Three views of the reversing device II-2 are shown in FIG. 5. The device includes a reversing device upper seat II-2-1, a reversing device lower seat II-2-2, the reversing block II-2-3, a regulating sleeve 1 II-2-4, a regulating sleeve 2 II-2-5, a pressure regulating nut 1 II-2-6, a pressure regulating nut 2 II-2-7, a regulating screw 1 II-2-8, a regulating screw 2 II-2-9, a spring seat 1 II-2-10, a spring seat 2 II-2-11, a pressure regulating spring 1 II-2-12, a pressure regulating spring 2 II-2-13, a spring base 1 II-2-14, a spring base 2 II-2-15, a valve core 1 II-2-16, a valve core 2 II-2-17 and the reversing motor II-2-18.

Figure 6:
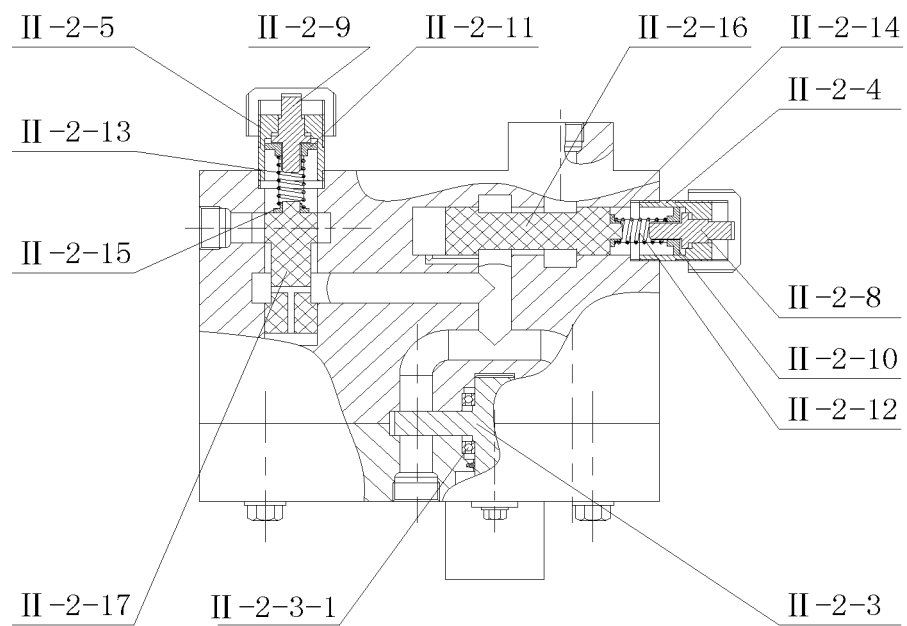
Figure 7A:
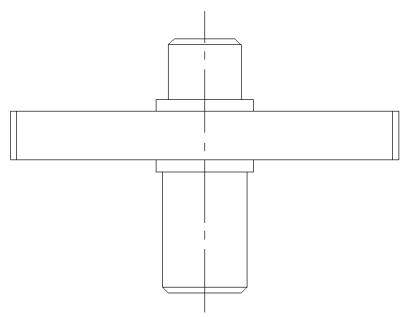
Figure 7B:
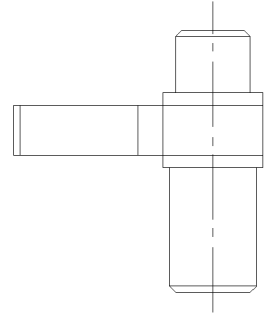
Figure 7C:
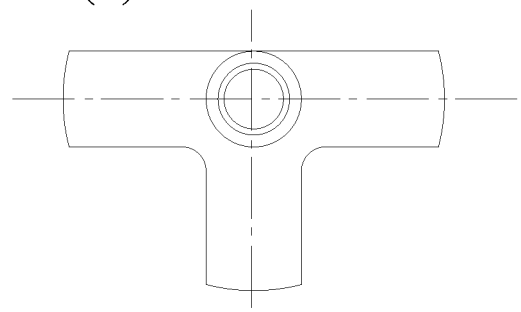
Figure 8:
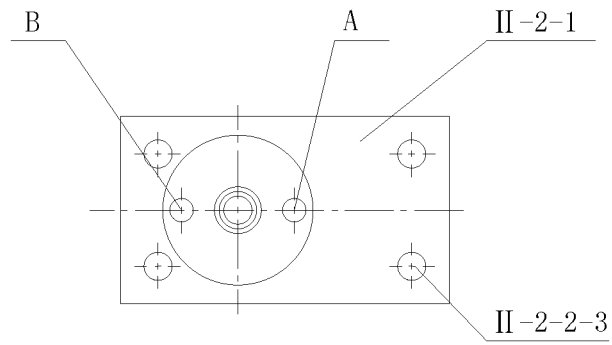
Figure 9:
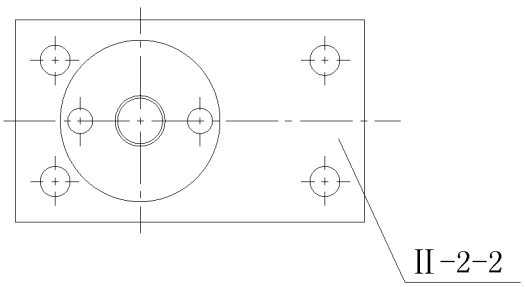
Figure 10:
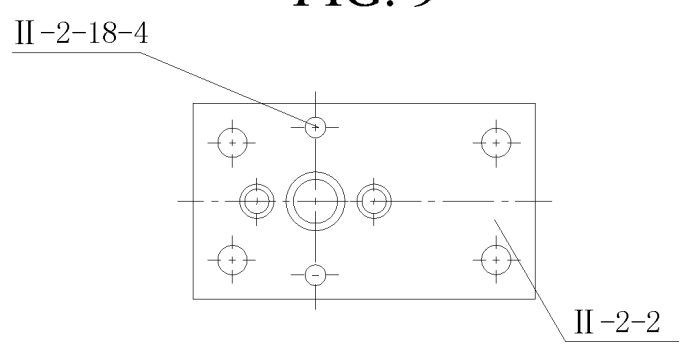

An internal assembly of the reversing device II-2 is shown in FIG. 6; three views of the reversing block II-2-3 are shown in FIG. 7; a bottom view of the reversing device upper seat II-2-1 is shown in FIG. 8; and a top view and a bottom view of the reversing device lower seat II-2-2 are shown in FIG. 9 and FIG. 10. The reversing block II-2-3 is mounted in the reversing device upper seat II-2-1 and the reversing device lower seat II-2-2 through a reversing block bearing II-2-3-1. The reversing device upper seat II-2-1 and the reversing device lower seat II-2-2 are connected together through a reversing device bolt gasket II-2-2-1, a reversing device bolt II-2-2-2 and a reversing device bolt hole II-2-2-3. The regulating sleeve 1 II-2-4 and the regulating sleeve 2 II-2-5 have threads, and are mounted on the reversing device upper seat II-2-1 through thread connection. The pressure regulating nut 1 II-2-6 and the pressure regulating nut 2 II-2-7 are respectively mounted on the regulating sleeve 1 II-2-4 and the regulating sleeve 2 II-2-5. The regulating screw 1 II-2-8, the spring seat 1 II-2-10 and the pressure regulating spring 1 II-2-12 are sequentially mounted in the regulating sleeve 1 II-2-4, and a tail end of the pressure regulating spring 1 II-2-12 is mounted on the spring base 1 II-2-14 and connected with the valve core 1 II-2-16. The regulating screw 2 II-2-9, the spring seat 2 II-2-11 and the pressure regulating spring 2 II-2-13 are sequentially mounted in the regulating sleeve 2 II-2-5, and a tail end of the pressure regulating spring 2 II-2-13 is mounted on the spring base 2 II-2-15 and connected with the valve core 2 II-2-17.

The regulating sleeve 1 II-2-4, the pressure regulating nut 1 II-2-6, the regulating screw 1 II-2-8, the spring seat 1 II-2-10, the pressure regulating spring 1 II-2-12, the spring base 1 II-2-14 and the valve core 1 II-2-16 form a cutting fluid pressure relieving device in the cavity of the reversing device upper seat II-2-1, and a pressure of the cutting fluid in the cavity is regulated by regulating a preload of the regulating screw 1 II-2-8. The regulating sleeve 2 II-2-5, the pressure regulating nut 2 II-2-7, the regulating screw 2 II-2-9, the spring seat 2 II-2-11, the pressure regulating spring 2 II-2-13, the spring base 2 II-2-15 and the valve core 2 II-2-17 form a cutting fluid overflow device in the reversing device upper seat II-2-2, and the maximum pressure of the cutting fluid in the cavity is controlled by regulating a preload of the regulating screw 2 II-2-9, thereby protecting the reversing device.

The reversing motor II-2-18 is a stepping motor, and is mounted on an outer side of the reversing device lower seat through a reversing motor bolt gasket II-2-18-1, a reversing motor bolt II-2-18-2 and a reversing motor bolt hole II-2-18-3. The reversing motor II-2-18 is connected with one end of the reversing block II-2-3 through a reversing motor coupling II-2-18-3. The reversing motor II-2-18 serves as an actuating mechanism of the motor control center I-8, and performs angular rotation by the number of received pulse signals. The reversing motor II-2-18 provides power for the reversing block II-2-3, so as to drive the reversing block II-2-3 to rotate in the reversing device II-2, thereby realizing the switching between the internal cooling device pipe A and the external cooling device pipe B by the reversing block II-2-3.

Figure 11:
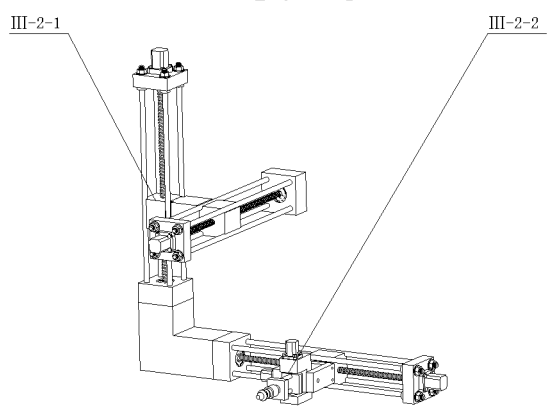

An overall structure of the external cooling device III-2 is shown in FIG. 11. The external cooling device III-2 is configured to deliver the cutting fluid to a nozzle device III-2-2-6 through a pipeline, and spray the cutting fluid through a nozzle to cool the cutting tool and the machined workpiece. The external cooling device includes an X, Y, Z telescopic arm module III-2-1 and a nozzle angle module III-2-2.

Figure 12:
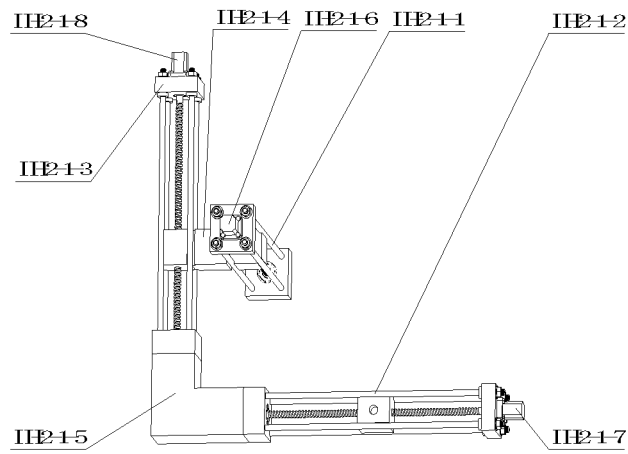

The structure of the telescopic arm module III-2-1 is shown in FIG. 12. The telescopic arm module III-2-1 includes an X direction telescopic arm III-2-1-1, a Y direction telescopic arm III-2-1-2, a Z direction telescopic arm III-2-1-3, an X and Z direction telescopic arm connector III-2-1-4, a Z and Y direction telescopic arm connector III-2-1-5, an X direction telescopic arm motor III-2-1-6, a Y direction telescopic arm motor III-2-1-7 and a Z-direction telescopic arm motor III-2-1-8.

Figure 13:
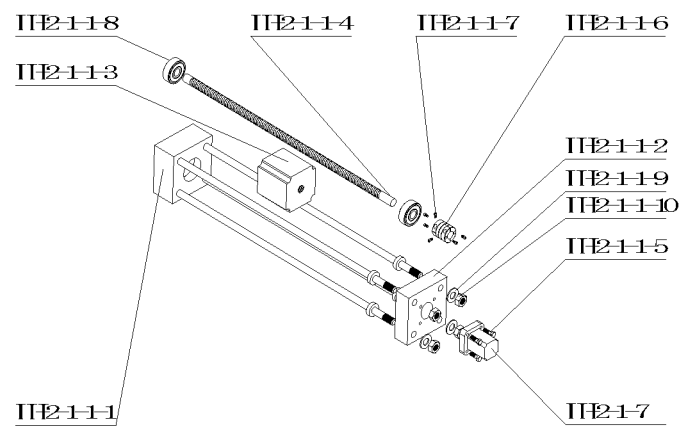

An exploded view of the telescopic arm III-2-1-1 is shown in FIG. 13. The X direction telescopic arm, the Y direction telescopic arm and the Z direction telescopic arm include a telescopic arm support III-2-1-1-1, a telescopic arm end cover III-2-1-1-2, a moving slider III-2-1-1-3 and a lead screw III-2-1-1-4. The X direction telescopic arm motor III-2-1-6, the Y direction telescopic arm motor III-2-1-7 and the Z direction telescopic arm motor III-2-1-8 are stepping motors, and are connected to and mounted on an outer side of the telescopic arm end cover III-2-1-1-2 through a bolt III-2-1-1-5. The stepping motor is connected with one end of the lead screw III-2-1-1-4 through a stepping motor coupling III-2-1-1-6, and the other end of the lead screw III-2-1-1-4 is mounted on the telescopic arm support III-2-1-1-1 through a telescopic arm bearing III-2-1-1-8. The stepping motor provides power for the lead screw III-2-1-1-4, so as to drive the moving slider III-2-1-1-3 to move on the telescopic arm support III-2-1-1-1, thereby controlling the movement of the nozzle in the X, Y and Z directions. The telescopic arm support III-2-1-1-1 is fastened with the telescopic arm end cover III-2-1-1-2 through a support gasket III-2-1-1-9 and a support bolt III-2-1-1-10.

Figure 14:
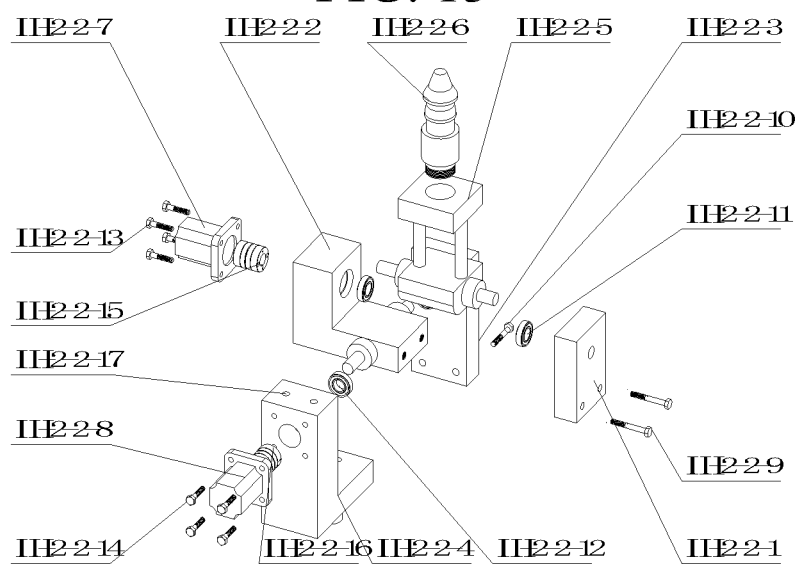

An exploded view of the nozzle angle module III-2-2 is shown in FIG. 14. The nozzle angle module III-2-2 includes a nozzle first pedestal right pedestal III-2-2-1, a nozzle first pedestal left pedestal III-2-2-2, a nozzle second pedestal right pedestal III-2-2-3, a nozzle second pedestal left pedestal III-2-2-4, a nozzle support III-2-2-5, the nozzle device III-2-2-6, a first pedestal motor III-2-2-7 and a second pedestal motor III-2-2-8.

Figure 15:
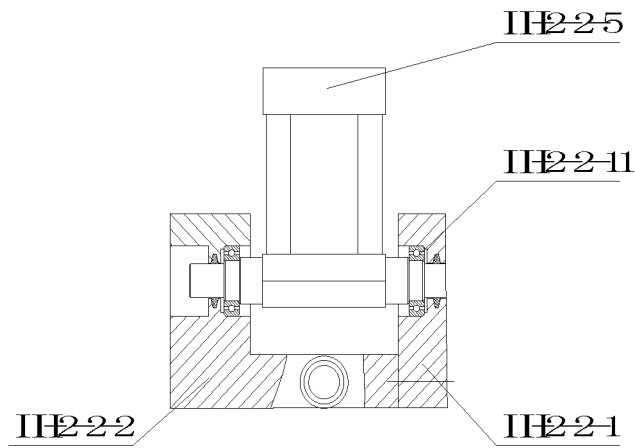
Figure 16:
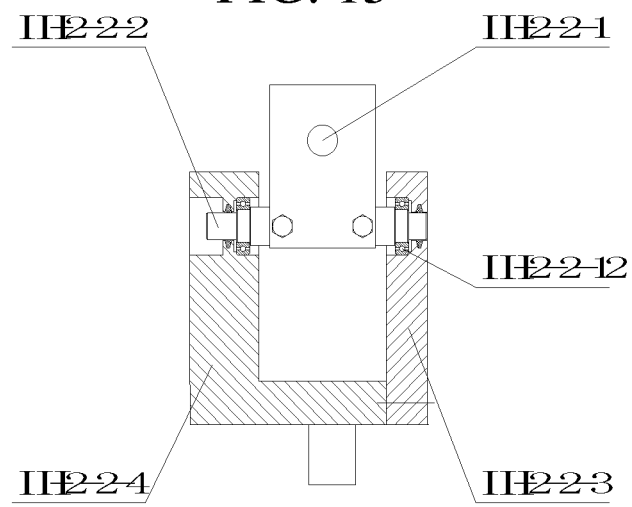

An assembly diagram of the nozzle support III-2-2-5 is shown in FIG. 15, and an assembly diagram of the nozzle first pedestal left pedestal III-2-2-2 is shown in FIG. 16. The nozzle first pedestal right pedestal III-2-2-1 and the nozzle first pedestal left pedestal III-2-2-2 are connected together through a nozzle first pedestal bolt III-2-2-9. The nozzle second pedestal right pedestal III-2-2-3 and the nozzle second pedestal left pedestal III-2-2-4 are connected together through a nozzle second pedestal bolt III-2-2-10. The nozzle second pedestal right pedestal is mounted on a nozzle first pedestal through a first pedestal bearing III-2-2-11, and the nozzle support is mounted on a nozzle second pedestal through a support bearing III-2-2-12.

Figure 17A:
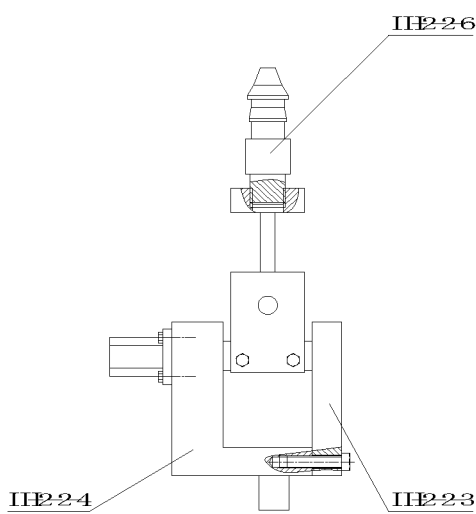
Figure 17B:
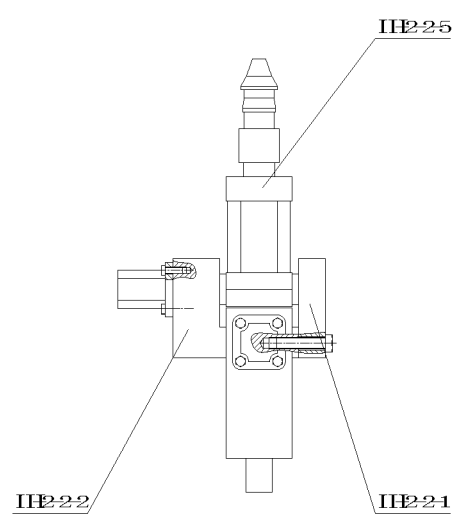
Figure 17C:
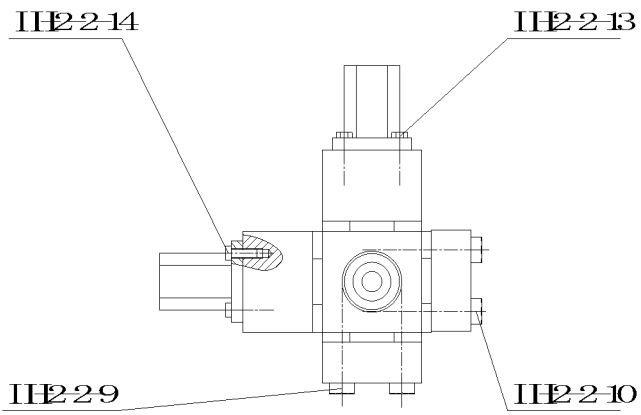

Three views of the nozzle angle module III-2-2 are shown in FIG. 17. The first pedestal motor III-2-2-7 and the second pedestal motor III-2-2-8 are stepping motors, and are respectively connected to and mounted on outer sides of the nozzle first pedestal right pedestal III-2-2-1 and the nozzle second pedestal right pedestal III-2-2-3 through a first pedestal bolt III-2-2-13 and a second pedestal bolt III-2-2-14. The first pedestal motor III-2-2-7 is connected with the nozzle support through a first pedestal coupling III-2-2-15, and the second pedestal motor III-2-2-8 is connected with the nozzle first pedestal left pedestal III-2-2-2 through a second pedestal coupling III-2-2-16. The first pedestal motor III-2-2-7 and the second pedestal motor III-2-2-8 are configured to control a rotation angle of the nozzle.

Figure 18:
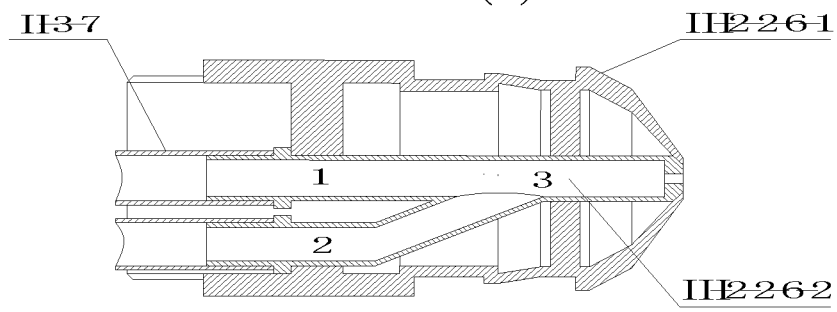

An assembly diagram of the nozzle device III-2-2-6 is shown in FIG. 18. The nozzle device III-2-2-6 includes a nozzle housing III-2-2-6-1 and a nozzle gas-liquid pipeline III-2-2-6-2. The nozzle gas-liquid pipeline is mounted in the nozzle housing, and includes a hollow pipe 3, a gas pipe 2 and a liquid pipe 1. The liquid pipe 1 is connected with the hollow pipe 3; the liquid pipe 1 is provided with an opening with a protrusion; and one end of the gas pipe 2 is bent and inserted into the opening of the liquid pipe 1. The nozzle housing III-2-2-6-1 is connected to the nozzle support III-2-2-5 through threads.

The vision system is connected to and mounted on the nozzle second pedestal left pedestal III-2-2-4 through the support via the vision system bolt I-11 and a bolt hole III-2-2-17, and the nozzle second pedestal left pedestal III-2-2-4 mounts the nozzle angle module III-2-2 onto the telescopic arm module III-2-1 through magnetic connection.

Milling depth data of the machine tool is collected; the milling depth data is transmitted to the control center for data analysis and processing; the data is compared with the initially set internal cooling/external cooling switching threshold to obtain the most suitable cooling and lubrication manner under the current machining conditions of the machine tool; and the control center controls the internal cooling and external cooling systems according to the obtained result to realize intelligent switching of the cooling and lubrication manner between internal cooling and external cooling.

Embodiment 2

In another typical implementation of the present disclosure, as shown in FIG. 1-FIG. 28, an internal cooling/external cooling-switching milling minimum-quantity-lubrication method using the internal cooling/external cooling-switching milling minimum-quantity-lubrication intelligent nozzle system as described in Embodiment 1 is provided. The method includes the following steps:

The method includes the following steps:
  a real-time milling depth image of a workpiece is acquired by the vision system and the real-time milling depth image is transmitted to the lubrication manner controller for processing;
  a lubrication manner under current conditions is determined and the reversing device is controlled to act according to a set milling depth threshold of the lubrication manner controller to make the internal cooling system or the external cooling system work;
  a lubricating fluid is delivered to the internal cooling pipe of the cutting tool by the internal cooling system for cyclic heat transfer to realize cooling and lubrication; and
  the lubricating fluid is mixed with a gas by the external cooling system, and the mixture is sprayed to a machining position of the workpiece through the nozzle device to realize cooling and lubrication, such that droplets output from the external cooling system impact a heat source surface and spread to form a liquid film along the heat source surface to perform heat transfer on the heat source surface.

Figure 19:
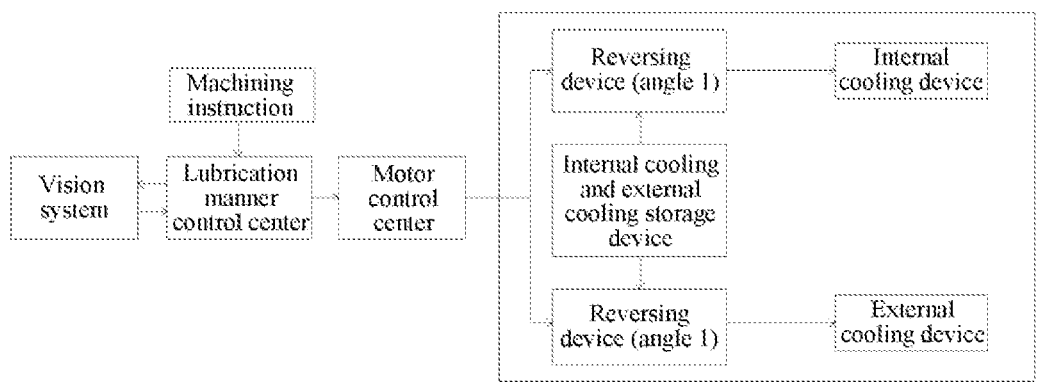
FIG. 19 is a block diagram of information transmission of the minimum-quantity-lubrication intelligent nozzle system in Embodiments 1 and 2.

Specifically, in conjunction with Embodiment 1, the detailed steps are described:

A block diagram of information transmission is shown in FIG. 19. At the beginning of machining, the lubrication manner control center I-6 receives a machining instruction and controls the vision system I to work. After starting working, the vision system I transmits a collected image of the workpiece milled by the cutting tool to the lubrication manner control center I-6. The image of the workpiece milled by the cutting tool is analyzed and processed to obtain real-time milling depth data of the cutting tool. A milling depth threshold for internal cooling/external cooling lubrication manner transformation is set in the lubrication manner control center I-6. The lubrication manner control center I-6 compares the obtained real-time milling depth data of the cutting tool with the set milling depth threshold, obtains a lubrication manner under current machining conditions according to the comparison result, and transmits the result to the motor control center I-8 in the form of analog semaphore. The motor control center I-8 is configured to receive the analog semaphore containing the lubrication manner required under the current milling conditions sent by the lubrication manner control center I-6, analyze and process the analog semaphore, control rotation of the reversing motor II-2-18 in a manner of different numbers of pulse signals, and control angular rotation of the reversing block II-2-3 in the reversing device II-2 in internal cooling and external cooling systems, so as to realize the switching of the cutting fluid flowing to the internal cooling device pipe A or the external cooling device pipe B, thereby completing the switching between the internal cooling system and the external cooling system. When the cutting fluid flowing out of the internal cooling and external cooling cutting fluid storage device II-1 flows through the reversing device II-2, it is determined whether the cutting fluid will flow to the internal cooling device II-3 or the external cooling device II-2 according to the fact whether the internal cooling device pipe A or the external cooling device pipe B in the adjusted reversing device II-2 is open under actual machining conditions, thereby realizing transformation to the most suitable lubrication manner of the machine tool for the workpiece under current milling conditions.

The switching between the internal cooling lubrication system and the external cooling lubrication system is realized by the rotation angle of the reversing block II-2-3 in the reversing device II-2. In terms of the angular regulation of the reversing block II-2-3, the angular rotation of the reversing motor II-2-18 is performed according to the number of pulse signals of the motor control center I-8 received by a driver of the reversing motor II-2-18, so as to control the angular regulation of the reversing block II-2-3, thereby realizing the switching of the lubrication system between internal cooling and external cooling.

Each type of stepping motor has its fixed step angle θ. The step angle θ is a mechanical angle that a rotor rotates when the stepping motor receives a pulse signal without a reduction gear. The step angle is specifically calculated as:

$$\theta = \frac{360°}{n_c \times n_p}$$

$n_c$ is the number of rotor teeth of the stepping motor, and $n_p$ is the number of operating beats of the stepping motor.

When the stepping motor rotates one cycle, the required number of pulse signals $N_{306°}$ is calculated as:

$$N_{360°} = \frac{360°}{\theta}$$

When the stepping motor rotates by an arbitrary angle, the required number of pulse signals $N_r$ is calculated as:

$$N_r = \frac{\theta_r}{\theta}$$

$\theta_r$ is the arbitrary angle that the stepping motor rotates. The above formula can be transformed into: $\theta_r = N_r \times \theta$ In this way, the rotation angle of the reversing block II-2-3 in the reversing device II-2 can be regulated by regulating the magnitude of the number of pulse signals $N_r$ given by the motor control center I-8 to the driver of the reversing motor stepping motor of the reversing device II-2, thereby realizing the switching between the internal cooling lubrication system and the external cooling lubrication system.

Figures 20A, 20B:
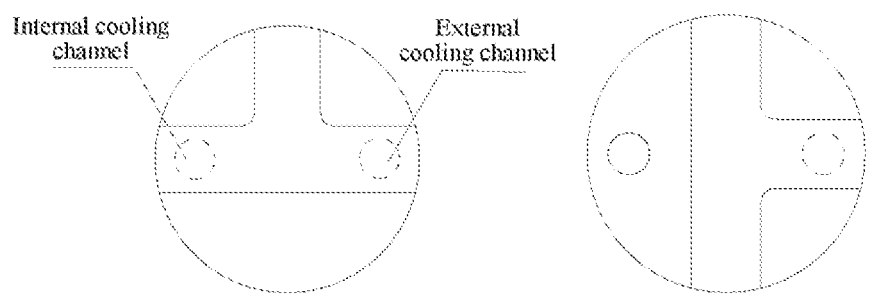
FIG. 20(*a*) shows a working state of the reversing device when the reversing block rotates by 0° or 360° in Embodiments 1 and 2.

According to the shape of the reversing block designed in this embodiment, the reversing device II-2 has four working states as shown in FIG. 20:

(1) As shown in FIG. 20(a), the reversing device II-2 at this time is in a working state that both an internal cooling channel A and an external cooling channel B are closed, and the internal cooling and external cooling lubrication systems are in a stop working state, and the rotation angle of the reversing block II-2-3 may be 0° or 360°. When the angle of the reversing block II-2-3 is 0°, that is, the reversing motor II-2-18 does not rotate, the motor control center I-8 does not give the stepping motor driver the pulse signals. When the angle of the reversing block is 360°, that is, the reversing motor II-2-18 rotates one cycle, the number of pulse signals given by the motor control center I-8 to the stepping motor driver at this time is:

$$N_{360°} = \frac{360°}{\theta}.$$

(2) As shown in FIG. 20(b), the reversing device II-2 at this time is in the working state that the internal cooling channel A is open and the external cooling channel B is closed, and the internal cooling and external cooling lubrication systems are switched to the internal cooling working state. The rotation angle of the reversing block II-2-3 is 90°, that is, the reversing motor II-2-18 rotates by 90°, and the number of pulse signals given by the motor control center I-8 to the stepping motor driver at this time is:

$$N_{90°} = \frac{90°}{\theta}.$$

Figure 20C:
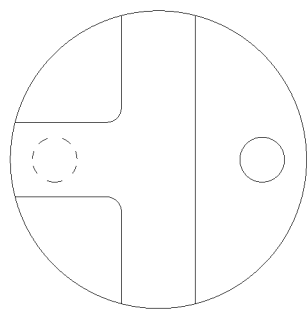

(3) As shown in FIG. 20(c), the reversing device II-2 at this time is in the working state that both the internal cooling channel A and the external cooling channel B are closed, and the internal cooling and external cooling lubrication systems are switched to the stop working state. The rotation angle of the reversing block II-2-3 is 180°. When the angle of the reversing block II-2-3 is 180°, that is, the reversing motor II-2-18 rotates by 180°, the number of pulse signals given by the motor control center I-8 to the stepping motor driver at this time is:

$$N_{180°} = \frac{180°}{\theta}.$$

Figure 20D:
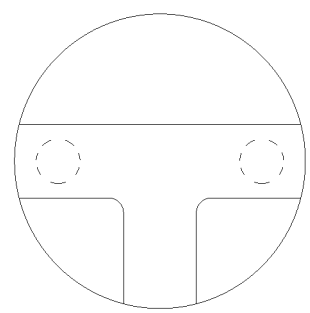

(4) As shown in FIG. 20(d), the reversing device II-2 at this time is in the working state that the external cooling channel B is open and the internal cooling channel A is closed, and the internal cooling and external cooling lubrication systems are switched to the external cooling working state. The rotation angle of the reversing block II-2-3 is 270°, that is, the reversing motor II-2-18 rotates by 270°, and the number of pulse signals given by the motor control center I-8 to the stepping motor driver at this time is:

$$N_{270°} = \frac{270°}{\theta}.$$

When N is equal to 0°, $N_{180°}$ or $N_{360°}$, the internal cooling and external cooling lubrication systems are in a stop state. When N is equal to $N_{90°}$, the internal cooling and external cooling lubrication systems are in the internal cooling working state. When N is equal to $N_{270°}$, the internal cooling and external cooling lubrication systems are in the external cooling working state. The number of pulse signals given by the motor control center respectively to the stepping motor driver of the reversing device: 0°, ($N_{180°}$ or $N_{360°}$), $N_{90°}$ or $N_{270°}$ can be controlled to realize the free switching between internal cooling and external cooling in this embodiment.

Figure 21A:
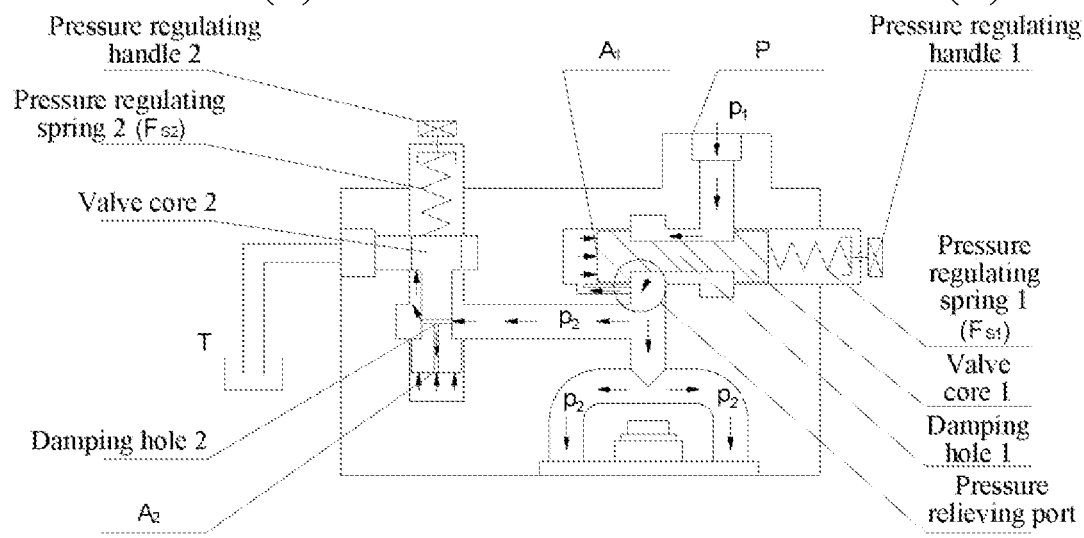
FIG. 21(*a*) is a working principle diagram of the reversing device before pressure relieving in Embodiments 1 and 2.

The working principle of the reversing device II-2 of this embodiment is shown in FIG. 21. As shown in FIG. 21(a), when the internal cooling pipe A or the external cooling pipe B is open, the cutting fluid with a pressure of $p_1$ enters a pressure relieving working cavity of the reversing device II-2 from a fluid inlet P, passes through a pressure relieving port and then enters an output hydraulic branch. Since a pressure loss is produced when the cutting fluid passes through a gap of the pressure relieving port, a pressure $p_2$ of the cutting fluid passing through the pressure relieving port is lower than the pressure $p_1$ of the cutting fluid at the fluid inlet. After the cutting fluid passes through the pressure relieving port, a part of the cutting fluid flows into a lower cavity of the valve core 1 II-2-16 through a side through hole, which will generate an upward thrust $p_2 A_1$, where $A_1$ is the effective working area of the left end of the valve core 1 II-2-16. When a rightward thrust generated by this part of the cutting fluid acting on the bottom end of the valve core 1 II-2-16 is less than a preload $F_{s1}$ of the pressure regulating spring 1 II-2-12, the valve core 1 II-2-16 is located at the leftmost end, the pressure relieving port is fully open and does not have a pressure relieving effect, and at this time, $p_1$ is approximately equal to $p_2$.

In addition, after passing through the pressure relieving port, the cutting fluid with the pressure of $p_2$ will flow leftward, and flow through the valve core 2 II-2-17 and a damping hole 2 to a lower end of the valve core 2 II-2-17, which generates an upward thrust $p_2 A_2$, where $A_2$ is the effective working area of the lower end of the valve core 2

II-2-17. A preload of the pressure regulating spring 2 II-2-13 at the upper end of the valve core 2 II-2-17 is $F_{s2}$. When the axial thrust $p_2A_2$ generated by the pressure $p_2$ of the cutting fluid is less than the spring preload $F_{s2}$, a self-weight G of the valve core 2 II-2-17 and a friction force $F_f$ between the valve core 2 II-2-17 and an inner cavity of the reversing device, the left outlet is closed, and the overflow device does not work.

Figure 21B:
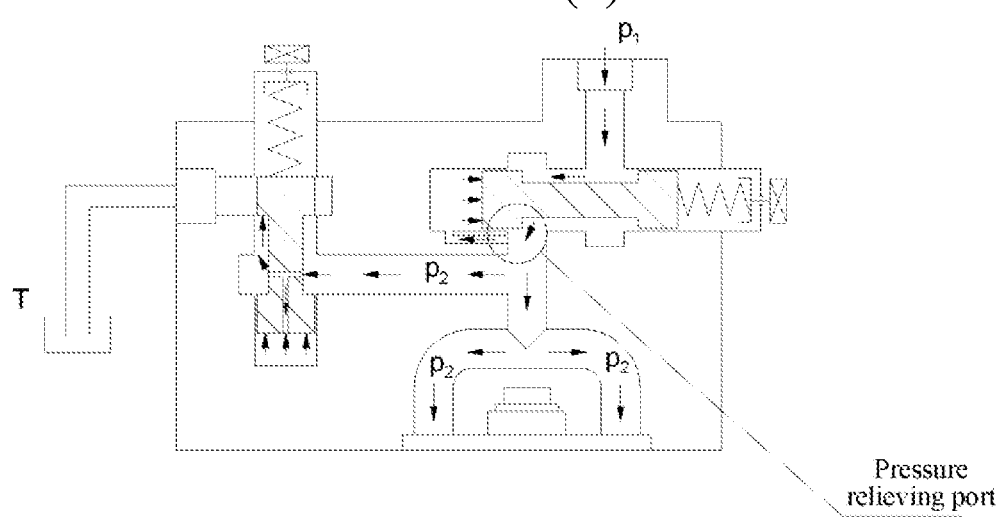

When the internal cooling pipe A or the external cooling pipe B is open and when the pressure $p_2$ of the cutting fluid passing through the pressure relieving port is greater than the preload $F_{s1}$ of the pressure regulating spring 1 II-2-12, that is: $p_2 \geq F_{s1}$, the valve core 1 II-2-16 overcomes the preload of the pressure regulating spring 1 II-2-12 and moves rightward under the action of the pressure of the cutting fluid in the left cavity, so that the pressure relieving port is reduced, as shown in FIG. 21(b). At this time, the pressure loss generated by the cutting fluid passing through the pressure relieving port makes the pressure $p_2$ of the cutting fluid passing through the pressure relieving port lower and stable in the counterforce range of the pressure regulating spring 1 II-2-12.

According to the balance relationship between the outlet pressure and pressure regulating spring 1 II-2-12: $p_2A_1=k_1(x_{01}+\Delta x)$.

The pressure $p_2$ of the cutting fluid passing through the pressure relieving port can be obtained as:

$$p_2 = \frac{k_1(x_{01}+\Delta x)}{A_1}.$$

$k_1$ is the spring stiffness of the pressure regulating spring 1 II-2-12, $x_{01}$ is the precompression amount of the pressure regulating spring 1 II-2-12, and $\Delta x$ is the displacement variation of the pressure relieving port.

It can be seen from the above formula that when the displacement variation $\Delta x$ of the pressure relieving port is much less than the precompression amount $x_{01}$ of the pressure regulating spring 1 II-2-12, the pressure $p_2$ of the cutting fluid passing through the pressure relieving port can basically remain stable. The preload $F_{s1}$ of the pressure regulating spring 1 II-2-12 can be regulated by regulating the pressure regulating nut 1 II-2-6, so that the pressure $p_2$ of the cutting fluid passing through the pressure relieving port can be regulated.

At this time, the axial thrust $p_2A_2$ generated by the pressure $p_2$ of the cutting fluid is less than the spring preload $F_{s2}$, the self-weight G of the valve core 2 II-2-17 and the friction force $F_f$ between the valve core 2 II-2-17 and the inner cavity of the reversing device, the left outlet is closed, and the overflow device does not work.

Figure 21C:
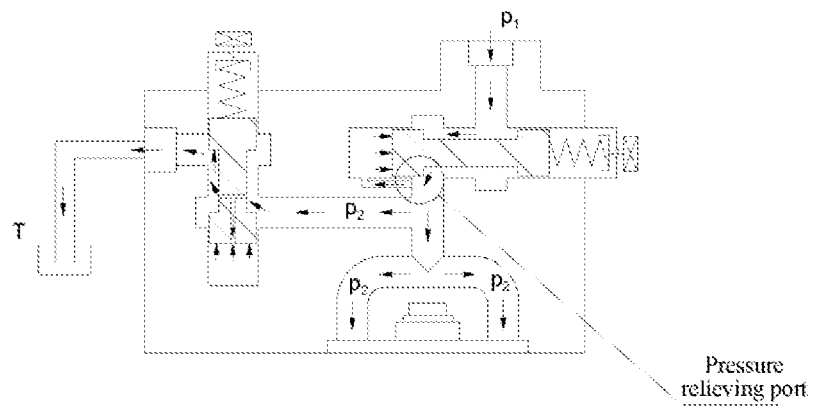

As shown in FIG. 21(c), when the internal cooling pipe A and the external cooling pipe B are closed, the pressure $p_2$ of the cutting fluid passing through the pressure relieving port will increase. At this time, the following situations will sequentially occur in the cavity where the valve core 2 II-2-17 is located:

(1) The pressure $p_2$ of the cutting fluid increases, so that the thrust $p_2A_2$ of the cutting fluid acting on the bottom end of the valve core 2 II-2-17 increases to be just enough to overcome the spring preload $F_{s2}$, the self-weight G of the valve core 2 II-2-17 and the friction force $F_f$ between the valve core 2 II-2-17 and the inner cavity of the reversing device, and the valve core 2 II-2-17 will start to move upward under the action of the thrust of the cutting fluid. According to the force balance relationship of the valve core 2 II-2-17:

$$p_kA_2=F_{s2}+G.$$

A critical opening pressure of the valve port is $$p_k = \frac{F_{s2}+G+F_f}{A_2} = \frac{k_2x_{02}+G+F_f}{A_2}.$$

$k_2$ is the spring stiffness of the pressure regulating spring 2 II-2-13, and $x_{02}$ is the spring preload of the pressure regulating spring 2 II-2-13.

(2) The pressure $p_2$ of the cutting fluid continues increasing, the valve core 2 II-2-17 will move upward, the valve port will be open, and the cutting fluid will flow into the cutting fluid storage device through the left outlet, that is, start to generate overflow. When the valve core 2 II-2-17 moves upward and is at a certain balance position, the pressure regulating spring 2 II-2-13 will be compressed by a certain distance x. At this time, the force balance equation of the valve core 2 II-2-17 becomes: $p_2A_2=k_2(x_{02}+x)+G+F_f$.

That is, the pressure $p_2$ of the cutting fluid at this time is:

$$p_2 = \frac{k_2(x_{02}+x)+G+F_f}{A_2}.$$

It can be seen from the above formula that when the overflow is generated, the pressure $p_2$ of the cutting fluid at this time is not affected by the change in the flow rate, but is affected by the spring stiffness and preload of the pressure regulating spring 2 II-2-13, the self-weight of the valve core 2 II-2-17 and the sliding friction force. The spring stiffness of the pressure regulating spring 2 II-2-13, the self-weight of the valve core 2 II-2-17 and the sliding friction force are constant after the reversing device is established, so the pressure $p_2$ of the cutting fluid at this time, that is, the overflow pressure, can be regulated by regulating the preload $F_{s2}$ of the pressure regulating spring 2 II-2-13. By regulating the overflow pressure, the overflow pressure can be made less than the maximum pressure that the reversing device can withstand, thereby protecting the reversing device.

The nozzle device includes the nozzle housing and the nozzle gas-liquid pipeline. The nozzle gas-liquid pipeline is mounted in the nozzle housing, and includes the hollow pipe, the gas pipe and the liquid pipe. As shown in FIG. 19, the external cooling supply adopts a minimum quantity lubrication manner. The cutting fluid flowing out of the external cooling pipeline of the reversing device flows through the pipeline to the liquid pipe in the nozzle gas-liquid pipeline in the nozzle device; the high-pressure gas flows through the pipeline into the gas pipe in the nozzle gas-liquid pipeline; and finally, the high-pressure gas in the gas pipe and the cutting fluid in the liquid pipe pass through the hollow pipe together to form mist droplets which are sprayed outward. Under the condition that the length of the gas pipe remains unchanged, the positional relationship among the hollow pipe, the gas pipe and the liquid pipe can be designed as three forms as shown in FIG. 22.

Figures 22A, 22B:
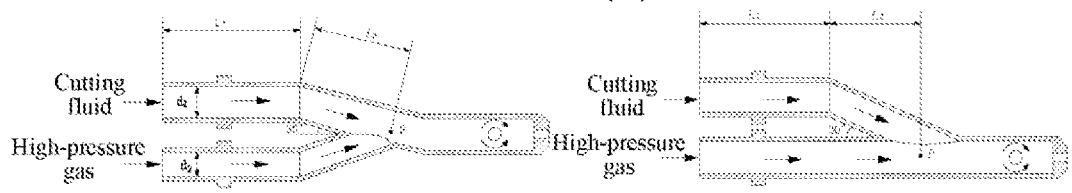
FIG. 22 (*a*) shows Form I of a nozzle gas-liquid pipeline in Embodiments 1 and 2.

Form I: As shown in FIG. 22(a), the tail end of the liquid pipe is set as a 30° bend; the tail end of the gas pipe is also set as a 30° bend; and the tail end of the gas pipe is inserted into the tail end of the liquid pipe and connected into the left end of the hollow pipe. The cutting fluid will pass through the bend zone in the process of flowing to the hollow pipe in the liquid pipe. When the cutting fluid passes through the bend zone, phenomena such as vortex, cavitation and strong impact will occur, so that the frictional resistance of liquid flow increases, causing a local pressure loss. In addition, the liquid is viscous. Because of the viscosity, friction is generated inside the liquid and between the liquid and the pipeline due to relative movement. Therefore, the liquid will also produce a frictional pressure loss in the process of flowing in the pipeline. Similarly, the gas will also produce a pressure loss when flowing through the gas pipe.

(1) The frictional pressure loss of the cutting fluid in the liquid pipe can be divided into two parts. As shown in FIG. 22(a), one part is the pressure loss caused by the cutting fluid in the horizontal straight pipe before the bend; and the other part is the pressure loss caused by the cutting fluid in the inclined pipeline after the bend and before a gas-liquid mixing point P. The two parts of frictional pressure loss of the cutting fluid in the liquid pipe can be calculated by the following formula:

$$\Delta p_\lambda = \Delta p_{\lambda_1} + \Delta p_{\lambda_2} = \lambda \cdot \frac{l_1}{d_1} \cdot \frac{\rho_1 v_1^2}{2} + \lambda \cdot \frac{l_2}{d_1} \cdot \frac{\rho_1 v_2^2}{2}.$$

$\lambda$ is the frictional resistance coefficient. The liquid pipe in this embodiment is made of metal, so the frictional resistance coefficient is $$\lambda = \frac{75}{Re}.$$

$l_1$ is the length of the horizontal straight pipe of the liquid pipe before the bend; $v_1$ is the flow velocity of the cutting fluid before the bend; $l_2$ is the length of the inclined pipeline of the liquid pipe after the bend and before the gas-liquid mixing point P; $v_2$ is the flow velocity of the cutting fluid after the bend, and $v_1$ is approximately equal to $v_2$; $d_1$ is the diameter of the liquid pipe; and $\rho_1$ is the density of the cutting fluid.

(2) When the cutting fluid passes through the bend part in the liquid pipe, the bend will lead to an increase in the motion resistance of the liquid, causing a pressure loss, as shown in FIG. 22(a). The local pressure loss of the cutting fluid at the bend can be calculated by the following formula:

$$\Delta p_\xi = \xi \frac{\rho_1 v_1^2}{2},$$

where $\xi$ is the local resistance coefficient. $\xi$ is 0.13.

According to the above analysis, it can be known that the total pressure loss of the cutting fluid in the nozzle gas-liquid pipeline is:

$$\Delta p_w = \Delta p_\lambda + \Delta p_\xi = \Delta p_{\lambda_1} + \Delta p_{\lambda_2} + \Delta p_\xi = \left[0.13 + \lambda \cdot \frac{(l_1 + l_2)}{d_1}\right] \cdot \frac{\rho_1 v_1^2}{2}.$$

In the process of flowing in the gas pipe, the gas may have a certain heat exchange with the outside through the pipe, and since the temperature is relatively uniform, it is often treated as an isothermal process. In order to simplify the calculation, the gas is often used as an incompressible fluid when considering the flow resistance. The pressure loss of gas per meter of pipe length in the gas pipe can be calculated by the following formula:

$$\Delta q = \frac{8\lambda q_m^2}{\pi^2 \rho_2 d_2^5}.$$

$q_m$ is the mass flow rate of the gas, $\lambda$ is the frictional resistance coefficient, and $d_2$ is the diameter of the gas pipe. $\rho_2$ is the gas density.

Then the total pressure loss is:

$$\Delta p = \Delta q \cdot (l_1 + l_2) = \frac{8\lambda q_m^2}{\pi^2 \rho_2 d_2^5}(l_1 + l_2).$$

The total pressure loss caused by the nozzle gas-liquid pipeline shown in Form I is:

$$\Delta P_1 = \Delta p_w + \Delta p = \left[0.13 + \lambda \cdot \frac{(l_1 + l_2)}{d_1}\right] \cdot \frac{\rho_1 v_1^2}{2} + \frac{8\lambda q_m^2}{\pi^2 \rho_2 d_2^5}(l_1 + l_2).$$

Form II: As shown in FIG. 22(b), the tail end of the liquid pipe is set as a 30° bend; the gas pipe is a horizontal straight pipe; and the tail end of the liquid pipe is inserted into the gas pipe and connected into the left end of the hollow pipe along with the gas pipe. The cutting fluid will pass through the bend zone in the process of flowing to the hollow pipe in the liquid pipe. When the cutting fluid passes through the bend zone, the phenomena such as vortex, cavitation and strong impact will occur, so that the frictional resistance of liquid flow increases, causing a local pressure loss. In addition, the liquid is viscous. Because of the viscosity, friction is generated inside the liquid and between the liquid and the pipeline due to relative movement. Therefore, the liquid will also produce a frictional pressure loss in the process of flowing in the pipeline. Similarly, the gas will also produce a pressure loss when flowing through the gas pipe.

(1) The frictional pressure loss of the cutting fluid in the liquid pipe can be divided into two parts. As shown in FIG. 22(b), one part is the pressure loss caused by the cutting fluid in the horizontal straight pipe before the bend; and the other part is the pressure loss caused by the cutting fluid in the inclined pipeline after the bend and before the gas-liquid mixing point P. The two parts of frictional pressure loss of the cutting fluid in the liquid pipe can be calculated by the following formula:

$$\Delta p_\lambda = \Delta p_{\lambda_1} + \Delta p_{\lambda_2} = \lambda \cdot \frac{l_1}{d_1} \cdot \frac{\rho_1 v_1^2}{2} + \lambda \cdot \frac{\frac{l_2}{\cos 30°}}{d_1} \cdot \frac{\rho_1 v_1^2}{2}.$$

(2) When the cutting fluid passes through the bend part in the liquid pipe, the bend will lead to an increase in the motion resistance of the liquid, causing a pressure loss, as shown in FIG. 22(b). The local pressure loss of the cutting fluid at the bend can be calculated by the following formula:

$$\Delta p_\xi = \xi \frac{\rho_1 v_1^2}{2}.$$

$\xi$ is the local resistance coefficient.

According to the above analysis, it can be known that the total pressure loss of the cutting fluid in the nozzle gas-liquid pipeline is:

$$\Delta p_w = $$

$$\Delta p_\lambda + \Delta p_\xi = \Delta p_{\lambda_1} + \Delta p_{\lambda_2} + \Delta p_\xi = \lambda \cdot \frac{\left(l_1 + \frac{l_2}{\cos 30°}\right)}{d_1} \cdot \frac{\rho_1 v_1^2}{2} + \xi \frac{\rho_1 v_1^2}{2}.$$

The pressure loss of the gas in the gas pipe is:

$$\Delta q = \frac{8\lambda q_m^2}{\pi^2 \rho_2 d_2^5}.$$

Then the total pressure loss is:

$$\Delta p = \Delta q \cdot (l_1 + l_2) = \frac{8\lambda q_m^2}{\pi^2 \rho_2 d_2^5}(l_1 + l_2).$$

The total pressure loss caused by the nozzle gas-liquid pipeline shown in Form II is:

$$\Delta P_2 = \Delta p_w + \Delta p = \left[0.13 + \lambda \cdot \frac{\left(l_1 + \frac{l_2}{\cos 30°}\right)}{d_1}\right] \cdot \frac{\rho_1 v_1^2}{2} + \frac{8\lambda q_m^2}{\pi^2 \rho_2 d_2^5}(l_1 + l_2).$$

Figure 22C:
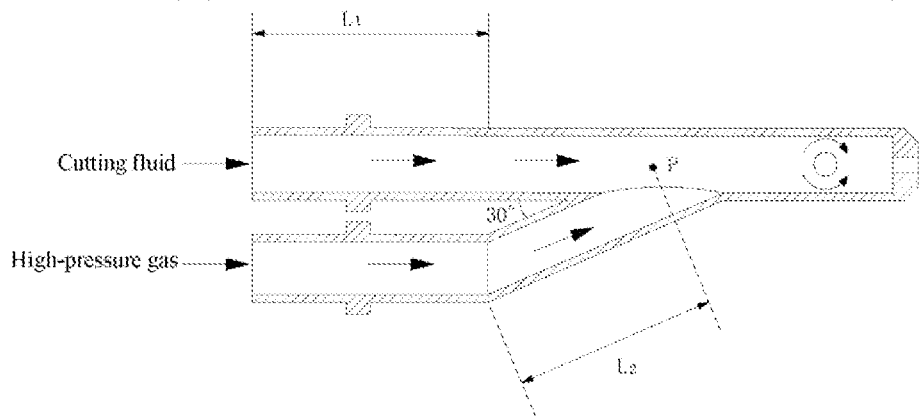

Form III: As shown in FIG. 22(c), the tail end of the gas pipe is set as a 30° bend; the liquid pipe is a horizontal straight pipe; and the tail end of the gas pipe is inserted into the liquid pipe and connected into the left end of the hollow pipe along with the liquid pipe. In the process of the cutting fluid flowing to the hollow pipe in the liquid pipe, the liquid is viscous. Because of the viscosity, friction is generated inside the liquid and between the liquid and the pipeline due to relative movement. Therefore, the liquid will also produce a frictional pressure loss in the process of flowing in the pipeline. Similarly, the gas will also produce a pressure loss when flowing through the gas pipe.

The frictional pressure loss of the cutting fluid in the liquid pipe can be calculated by the following formula:

$$\Delta p_w = \Delta p_\lambda = \Delta p_{\lambda_1} + \Delta p_{\lambda_2} = $$

$$\lambda \cdot \frac{l_1}{d_1} \cdot \frac{\rho_1 v_1^2}{2} + \lambda \cdot \frac{\cos 30° l_2}{d_1} \cdot \frac{\rho_1 v_1^2}{2} = \lambda \cdot \frac{(l_1 + \cos 30° l_2)}{d_1} \cdot \frac{\rho_1 v_1^2}{2}.$$

The pressure loss of the gas in the gas pipe is:

$$\Delta q = \frac{8\lambda q_m^2}{\pi^2 \rho_2 d_2^5}.$$

Then the total pressure loss is:

$$\Delta p = \Delta q \cdot (l_1 + l_2) = \frac{8\lambda q_m^2}{\pi^2 \rho_2 d_2^5}(l_1 + l_2).$$

The total pressure loss caused by the nozzle gas-liquid pipeline shown in Form III is:

$$\Delta P_3 = \Delta p_w + \Delta p = \lambda \cdot \frac{(l_1 + \cos 30° l_2)}{d_1} \cdot \frac{\rho_1 v_1^2}{2} + \frac{8\lambda q_m^2}{\pi^2 \rho_2 d_2^5}(l_1 + l_2).$$

Comparing the total pressure loss of the three forms of nozzle gas-liquid pipeline structure, it is easy to see $\Delta P_2 > \Delta P_1 > \Delta P_3$.

Therefore, in this embodiment, the following structure is preferred: the tail end of the gas pipe is set as a 30° bend; the liquid pipe is a horizontal straight pipe; and the tail end of the gas pipe is inserted into the liquid pipe and connected into the left end of the hollow pipe along with the liquid pipe.

After the cutting fluid and the high-pressure gas merge at Point P, the cutting fluid is atomized under the action of the high-pressure gas. The atomization of the cutting fluid can be classified into two manners: jet atomization and breaking atomization.

The jet atomization means that when lubricating oil is sprayed out in the form of a continuous liquid through an oil spray hole, the disturbance of the outside gas will cause vibration waves on the jet surface. As the amplitude of the vibration waves increases, the jet will be cracked into liquid flakes and large-diameter droplets. When the droplet diameter exceeds a critical value, the droplet will fragment into lots of small droplets. The size of droplets depends on the nozzle structure, gas flow state, external conditions and the like.

Figure 23:
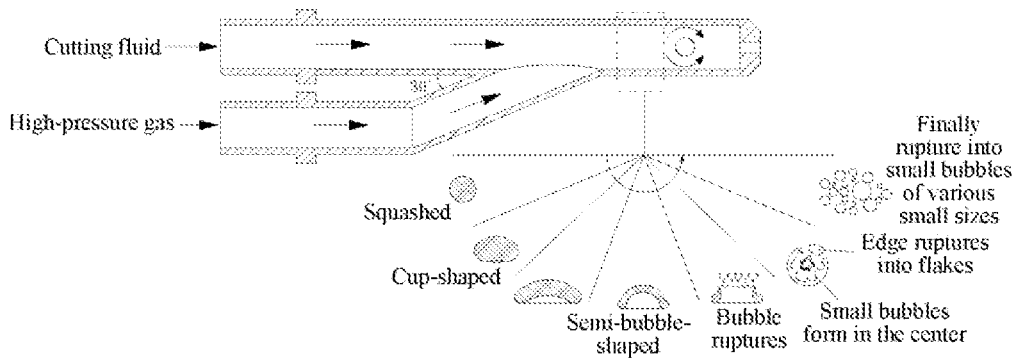
FIG. 23 is a flow chart of breaking atomization of the nozzle gas-liquid pipeline in Embodiments 1 and 2.

The breaking atomization is shown as FIG. 23, and means that the droplet is cracked into small oil droplets in various forms under the aerodynamic action of high-velocity gas flow. The initial droplet gradually becomes ellipsoidal, cup-shaped and semi-bubble-shaped under the action of gas pressure. If the relative velocity of the high-velocity gas flow to the droplet is large and exceeds the critical value, the top of the semi-bubble-shaped droplet ruptures first and becomes an annular liquid belt. The annular liquid belt has different thicknesses, and accounts for 70% by mass of the large-diameter spherical droplet. Under the further tearing action of the gas flow, the outer edge of the annular liquid belt is separated into flakes, the center is cracked into lots of small liquid bubbles, and finally, the whole annular liquid belt fragments into small droplets or small liquid bubbles of different sizes.

In the nozzle gas-liquid pipeline structure of Form III, the force of the cutting fluid droplet is shown in FIG. 24, $$\vec{F}_\Sigma = \vec{F}_D + \vec{F}_P + \vec{F}_Q + \vec{F}_W.$$

$\vec{F}_\Sigma$ is the resultant force received by the droplet; $\vec{F}_D$ is the viscous force of the gas flow on the mist droplet; $\vec{F}_P$ is the acting force of the pressure gradient on the mist droplet; $\vec{F}_Q$ is the force received by the cutting fluid droplet itself under pressure; and $\vec{F}_W$ is the gravity.

For $\vec{F}_D$, in any case, there is a relative velocity $\vec{v}_2-\vec{v}_1$ in the movement between the surrounding gas flow and the mist droplet, and the viscous force is:

$$\vec{F}_D = \frac{C_D A_P \rho_f}{2}(\vec{v}_2-\vec{v}_1)|\vec{v}_2-\vec{v}_1|.$$

$A_p$ is the face area of the mist droplet; $\rho_f$ is the gas density; $\vec{v}_1$ is the mist droplet velocity; $\vec{v}_2$ is the gas flow velocity; and $C_D$ is the resistance coefficient.

$$C_D = \begin{cases} \frac{24}{R_e}\left(1+\frac{R_e^{\frac{2}{3}}}{6}\right) & R_e \leq 1000 \\ 0.424 & R_e > 1000 \end{cases}.$$

The Reynolds number is defined as $$R_e = \frac{|\vec{v}_2-\vec{v}_1|}{\mu_f}d_e;$$

then $F_D = 3\pi\mu_f d_e(\vec{v}_2-\vec{v}_1)f(R_e)$.

$\mu_f$ is the kinematic viscosity coefficient of the fluid; and $d_e$ is the diameter of the oil droplet.

Assuming that there is a pressure gradient $\partial p/\partial n$ along the direction of the gas flow velocity $\vec{v}_2$, then $$\vec{F}_P = -\frac{\pi}{6}d_e^3\frac{\partial p}{\partial n}.$$

Since the oil droplet is a sparse suspended phase, assuming that the gas flow field is not disturbed by the presence of the mist droplet, the Navier-Stokes equation is still satisfied:

$$\rho_f\frac{d\vec{v}_2}{dt} = \rho_f g_i - \frac{\partial p}{\partial n} - \frac{2}{3}\mu_f\frac{\partial}{\partial x_l}(\nabla\cdot\vec{v}_2).$$

Since $d_e$ is very small, the above formula can be simplified as $$-\frac{\partial p}{\partial n} = \rho_f\frac{d\vec{v}_2}{dt};$$

then $$\vec{F}_P = -\frac{\pi}{6}d_e^3\rho_f\frac{d\vec{v}_2}{dt}.$$

As shown in FIG. 25, sections I-I and II-II are taken respectively at the point where the cutting fluid just enters the liquid pipe and at Point P, and the Bernoulli's equation of the two sections is listed as $p_2+\rho_1 gh_1+\frac{1}{2}\rho\alpha_1 v_1^2 = p_2'+\rho_1 gh_2+\frac{1}{2}\rho\alpha_1 v_1^2+\Delta p_w$.

Then $p_2'=p_2+\rho_1 g(h_1-h_2)-\Delta p_w$.

$p_2$ is the pressure of the cutting fluid just entering the liquid pipe, for Form III: $h_1-h_2=0$.

Then:

$$F_{Q3} = A_p p_2' = \frac{\pi d_e^2}{4}\cdot(p_2-\Delta p_w);$$

and the direction is the same as the direction of the droplet velocity.

The magnitude of the weight of the droplet is:

$$F_W = m_p g = \frac{\rho_2 \pi d_e^3 g}{6}.$$

$m_p$ is the mass of the droplet, and the direction of the weight of the droplet is vertically downward.

Then the total resultant force received by the droplet is $$\vec{F}_\Sigma = 3\pi\mu_f d_e(\vec{v}_2-\vec{v}_1)f(R_e) + \frac{\pi}{6}d_e^3\rho_f\frac{d\vec{v}_2}{dt} + \frac{\pi d_e^2}{4}\cdot(p_2-\Delta p_w)\vec{i} + \frac{\rho_2\pi d_e^3 g}{6}\vec{j}.$$

$\vec{i}$ the unit vector, which forms an angle of 30° downward with the positive half of the x-axis. $\vec{j}$ is the unit vector, and the direction points to the negative half of the y-axis.

Figure 26A:
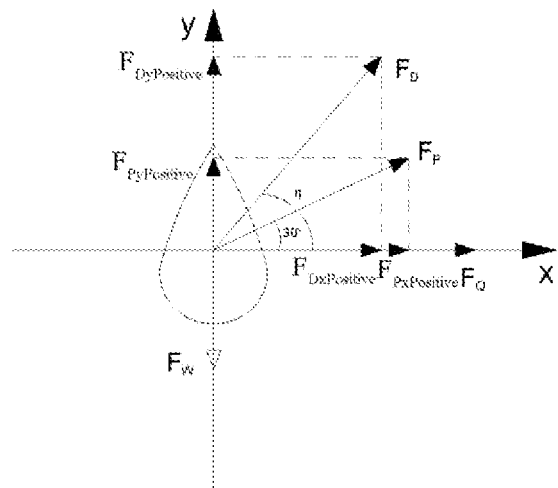

For the droplet of Form III, force analysis in the x and y directions is respectively performed, and the result is shown in FIG. 26(a).

Figure 26B:
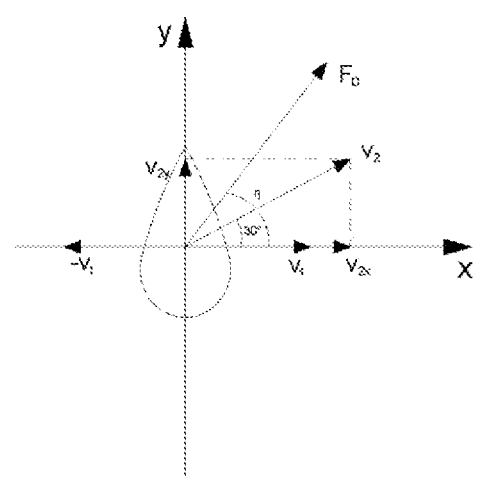

According to the formula, it can be known that the direction of $\vec{F}_D$ forms an $\eta$ angle with the horizontal coordinate X. The magnitude of the $\eta$ angle is related to the gas flow velocity $\vec{v}_2$ and the velocity of the cutting fluid droplet $\vec{v}_1$. The force direction diagram is shown in FIG. 26(b), $$\tan\eta = \frac{v_{2y}}{v_{2x}-v_1} = \frac{v_2\sin 30°}{v_2\cos 30°-v_1}.$$

The direction of $\vec{F}_P$ is the same as that of the gas flow velocity $\vec{v}_2$, the direction of $\vec{F}_Q$ is the same as that of the velocity of the cutting fluid droplet $\vec{v}_1$, and the gravity $\vec{F}_W$ is vertically downward.

$$F_{3yPositive} = F_{DyPositive}+F_{PyPositive} = F_D\sin\eta°+F_P\sin 30°$$

$$F_{3yNegative} = F_W$$

$$F_{3xPositive} = F_{DxPositive}+F_{PxPositive}+F_Q = F_D\cos\eta°+F_P\cos 30°+F_Q$$

Then the magnitude of the resultant force $\vec{F}_\Sigma$ is $$F_\Sigma = \sqrt{|F_{3yPositive} - F_{3yNegative}|^2 + F_{3xPositive}^2} =$$

$$\sqrt{|F_D\sin\eta° + F_P\sin30° - F_W|^2 + (F_D\cos\eta° + F_P\cos30° + F_Q)^2}.$$

Then the direction of the resultant force $\vec{F}_\Sigma$ is $$\tan\theta = \frac{|F_{3yPositive} - F_{3yNegative}|}{F_{3xPositive}} = \frac{|F_D\sin\eta° + F_P\sin30° - F_W|}{F_D\cos\eta° + F_P\cos30° + F_Q}.$$

For the cutting fluid droplet, the received resultant force $\vec{F}_\Sigma$ causes the droplet to rupture. Assuming that the magnitude of the critical force of the cutting fluid droplet at the critical rupture point is $F_L$, then the magnitude of the difference $F_A$ between the magnitude of the resultant force $\vec{F}_\Sigma$ and the force of the droplet at the critical rupture point reflects the rupture effect of the droplet:

$$F_A = |F_\Sigma - F_L|$$

As shown in FIG. 25, sections I-I and are taken respectively at the point where the gas just enters the gas pipe and at Point P, and the Bernoulli's equation of the two sections is listed as $p_q + \rho_2 g h_3 + \frac{1}{2}\rho\alpha_1 v_2^2 = p_q' + \rho_2 g h_2 + \frac{1}{2}\rho\alpha_1 v_2^2 + \Delta q$; then $p_q' = p_q + \rho_2 g(h_3 - h_2) - \Delta q$.

$P_q$ is the pressure of the gas just entering the gas pipe, $h_3 - h_2 = -l_2 \sin 30°$.

$$p_q' = p_q - \rho_2 g l_2 \sin 30° - \Delta q.$$

After Point P, the gas will drive the broken cutting fluid droplets to flow into the hollow pipe, and the pressure of the gas-liquid mixture is $$p_3 = p_2' + p_q' = p_2 - \Delta p_w + p_q - \rho_2 g l_2 \sin 30° - \Delta q = p_2 + p_q - \rho_2 g l_2 \sin 30° - \Delta P_3.$$

It is assumed that the flow velocity of the gas-liquid mixture is $v_3$.

When the gas-liquid two-phase flow flows to the nozzle orifice, since the pipe diameter is sharply reduced, an orifice throttling phenomenon will occur. As shown in FIG. 25, at this time, sections Iv-Iv and V-V are taken respectively at positions where no neck-down occurs when the gas-liquid two-phase flow enters and leaves the orifice. According to Bernoulli's equation: $p_3 + \rho g h_2 + \frac{1}{2}\rho\alpha_1 v_3^2 = p_4 + \rho g h_4 + \frac{1}{2}\rho\alpha_2 v_4^2 + \Delta p_{w1}$.

$h_2 = h_4$; $v_4$ is much greater than $v_3$, so $v_3$ is ignored. $\rho$ is the density of the gas-liquid two-phase flow, $\rho = \rho_2(1-\varepsilon) + \rho_1\varepsilon$. The flow of the necked-down section is turbulent, and $p_4$ is the pressure after the orifice; $\alpha_2$ is 1; and $\Delta p_{w1}$ is the local loss, being $$\Delta p_{w1} = \xi\frac{\rho v_2^2}{2}.$$

Then the velocity of the gas-liquid two-phase flow at the nozzle outlet is:

$$v_4 = \frac{1}{\sqrt{1+\xi}}\sqrt{\frac{2}{\rho}(p_3 - p_4)}.$$

The velocity of the droplet is also $v_4$.

The researchers have found according to the Bernoulli's equation that before the droplet impacts the micro-grinding region, the weight of the droplet appears very small as compared to the resistance of the surrounding air it receives. Therefore, the gravity of the droplet can be ignored, and it is only necessary to consider the influence of the viscous resistance of the surrounding air on the droplet. According to the principle of aerodynamics, the resistance of the surrounding air around the droplet to the droplet can be known:

$$F_D = \frac{C_D S_f \gamma_a}{2g} \cdot (v_a - v_4) \cdot |v_a - v_4|.$$

In the formula, $v_a$ is the velocity of the surrounding air; $y_a$ is the volumetric weight of the air; $S_f$ is the face area of the droplet; $C_D$ is the air resistance coefficient; and g is the gravitational acceleration.

In view of the fact that the flow velocity of the surrounding air of the droplet is much less than the velocity of the high-velocity droplet, the surrounding air is approximately regarded as in a static state, and thereby the formula can be expressed as $$F_D = -\frac{C_D S_f \gamma_a v_4^2}{2g}.$$

When the spray boundary is of a closed ellipse, the coverage area of the droplet group reaches the maximum. The total number of droplets $N_t$ is:

$$N_t = \frac{Q_f}{V_{d32} f}.$$

In the formula, $Q_f$ is the liquid supply flow rate of a spray device; f is the liquid supply frequency of the minimum-quantity-lubrication device; and $V_{d32}$ is the volume of the droplet with a particle size of $d_{32}$. $d_{32}$ is the Sauter average particle size, which has the physical meaning of a ratio of the volume mean of all droplets generated by the spray to the area mean of all droplets. Researchers generally replaces the original droplet group with a droplet group with the particle size of $d_{32}$, which has the same total volume and surface area as the original droplet group. The general expression of $d_{32}$ is:

$$\frac{d_{32}}{d_0} = 3.07\left[\frac{\rho_a^{0.5}(p_3 - p_4)d_0^{1.5}}{\sigma_t^{0.5}\mu}\right]^{-0.259}.$$

In the formula, $\sigma_t$ is the surface tension coefficient of the droplet; $\mu$ is the dynamic viscosity of the spray medium; $\rho_a$ is the density of the environmental medium at the nozzle outlet; and $d_0$ is the nozzle diameter.

Assuming that the spray droplets uniformly fall on the surface of the workpiece, then the number of droplets falling in the machining region is:

$$N_z = N_t \cdot \frac{s_g}{S_e}.$$

In the formula, $s_g$ is the cutting machining area; and $S_e$ is the ellipse area of the spray boundary.

The description of the initial droplet size adopts $x^2$-distribution:

$$P(D) = \frac{1}{6\overline{D}} D^3 e^{\frac{-D}{\overline{D}}}.$$

In the formula, $\overline{D}$ is the determined degree of freedom ($\overline{D}=d_{32}/3$), corresponding to the maximum value of $x^2$-distribution.

Weber criterion number (We number for short) and Laplace number (La number) are used to control the result after the droplet collides with the heat source surface:

$$We = \frac{\rho_f D v_6^2}{\sigma}; \quad La = \frac{\rho_f D \sigma}{\mu^2}.$$

In the formula, $\rho_f$ is the density of the spray cooling medium; $v_6$ is the vertical velocity component of the droplet on the heat source surface; $\sigma$ is the flow stress in the first deformation region corresponding to the minimum chip thickness; $\mu$ is the dynamic viscosity of the spray medium; and D is the particle size of the spray droplet.

The positional relationship between the nozzle and the workpiece is shown in FIG. 27. The horizontal distance from the nozzle to the workpiece is X, and the included angle between the nozzle and the horizontal surface is $\delta$. According to the conservation of energy:

$$\frac{1}{2} V_{d32} \rho_1 v_5^2 = \frac{1}{2} V_{d32} \rho_1 v_4^2 + F_D \frac{x}{\cos\delta}.$$

$$v_5 = \sqrt{\frac{V_{d32}\rho_1 v_4^2 + 2F_D \frac{x}{\cos\delta}}{V_{d32}\rho_1}} = \frac{1}{\sqrt{1+\xi}} \sqrt{\frac{2}{\rho}(p_3 - p_4)\left(1 - \frac{C_D S_f \gamma_a x}{V_{d32}\rho_1 g \cos\delta}\right)}.$$

After velocity analysis, the vertical velocity $v_6$ of the droplet falling on the surface of the workpiece is $$v_6 = \sin\delta \cdot v_5 = \frac{\sin\delta}{\sqrt{1+\xi}} \sqrt{\frac{2}{\rho}(p_3 - p_4)\left(1 - \frac{C_D S_f \gamma_a x}{V_{d32}\rho_1 g \cos\delta}\right)}.$$

As shown in FIG. 28, as the We number of incident droplets gradually increases, 3 behaviors, namely rebounding, spreading and splashing, will occur in sequence. When the energy of the initial droplet is relatively low, the droplet rebounds. When the droplet impacts the heat source surface with high energy, the droplet will form a coronal droplet splash. The droplet flies away from the coronal edge and breaks into lots of small droplets. In both cases, the droplets cannot effectively participate in heat transfer. Only when the droplet spreads, that is, when the droplet impacts the heat source surface and then spreads along the heat source surface to form a liquid film, effective heat transfer can be performed on the heat source surface. The critical We number of the droplet that spreads is:

$$2.0 \times 10^4 \times La^{-0.2} \leq We \leq 2.0 \times 10^4 \times La^{-1.4}.$$

From the above formula, the range of the particle size D of the droplet that spreads, that is, the droplet capable of realizing effective heat transfer, can be obtained: $D_{min} \leq D \leq D_{max}$. Therefore, the proportion of the droplets capable of realizing effective heat transfer is:

$$P = \int_{D_{min}}^{D_{max}} \frac{1}{6\overline{D}} D^3 e^{\frac{-D}{\overline{D}}} dD.$$

In the formula, $\overline{D}$ is the determined degree of freedom ($\overline{D}=d_{32}/3$), corresponding to the maximum probability of $$P(D) = \frac{1}{6\overline{D}} D^3 e^{\frac{-D}{\overline{D}}}$$

distribution.

The number of droplets capable of realizing effective heat transfer is:

$$N_e = N_z \cdot P(D).$$

The base fluid and the high-pressure gas sprayed by the nozzle to the heat source surface are regarded as a fluid jet and a high-pressure gas jet. According to the droplets capable of realizing effective heat transfer in the machining region above, probability statistical analysis is performed, and a heat transfer coefficient of a single fluid droplet is calculated, thereby obtaining a heat transfer coefficient of the fluid. The heat transfer coefficient of the fluid plus the heat transfer coefficient of the high-pressure gas jet is the convective heat transfer coefficient of the external cooling minimum-quantity-lubrication jet in the internal cooling and external cooling systems under conditions of spray cooling.

For a single fluid droplet, the heat transfer coefficient $h_s$ satisfies:

$$\begin{cases} J = c_1 m_d (\Delta T) \\ h_s = \dfrac{q_s}{\Delta T} \\ J = q_s A' t_s \end{cases}.$$

In the formula, J is the heat transfer amount of a single droplet; $c_f$ is the specific heat capacity of the droplet; $\Delta T$ is the heat transfer temperature difference; $q_s$ is the heat flux density of a single drop at heat transfer; $t_s$ is the heat transfer time; $m_d$ is the mass of the droplet; and A' is the spreading area of the droplet.

Based on the calculation of the number of effective droplets in the machining region, the heat transfer coefficient of all droplets capable of realizing effective heat transfer can be known:

$$h_n = N_z \int_{D_{min}}^{D_{max}} h_s \frac{1}{6\overline{D}^4} D^3 e^{-D/\overline{D}} dD.$$

The convective heat transfer coefficient $h_a$ of the high-pressure gas jet to the heat source surface is:

$$h_a = \frac{k_a N_u}{b}.$$

In the formula, Nu is the Nusselt number, which has the following relationship with Reynolds number (Re) and Prandtl number $$(Pr): \begin{cases} Nu = 0.906 \ Re^{1/2} Pr^{1/3} \\ Re = v_a \rho_a d_0 / \mu_a \\ Pr = \mu_a c_a / \lambda_a \end{cases}.$$

In the formula, $k_a$ is the thermal conductivity of air; $\mu_a$ is the dynamic viscosity of the gas; and $c_a$ is the specific heat capacity of air at constant pressure.

The convective heat transfer coefficient of the external cooling minimum-quantity-lubrication jet in the internal cooling and external cooling systems under conditions of spray cooling is: $h=h_n+h_a$.

The information transmission manners are all wireless transmission, and the Internet, for example, GPRS, 2G, 3G, 4G and the like, can be used for transmission. The above wireless transmission techniques are all mature techniques, all have complete working modules, and thus, can be used directly.

The foregoing descriptions are merely preferred embodiments of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. An internal cooling/external cooling-switching milling minimum-quantity-lubrication intelligent nozzle system, comprising:
    a vision system, configured to acquire a real-time milling depth of a workpiece and send the real-time milling depth to a lubrication manner controller for processing;
    a lubrication system, comprising an internal cooling system and an external cooling system connected together to a cutting fluid supply source through a reversing device; and
    the lubrication manner controller, configured to communicate with the vision system and the lubrication system respectively, and control the reversing device to act according to a set milling depth threshold and data acquired by the vision system, so as to adjust and switch to the internal cooling system or the external cooling system to work;
    wherein when the external cooling system works, droplets sprayed from a nozzle device of the external cooling system impact a heat source surface and spread to form a liquid film along the heat source surface.

2. The internal cooling/external cooling-switching milling minimum-quantity-lubrication intelligent nozzle system according to claim 1, wherein the vision system comprises an image collection device and a cradle head, the image collection device is mounted on the self-stabilizing cradle head, and the image collection device is configured to be mounted on a machine tool and acquire a real-time milling depth image of the workpiece.

3. The internal cooling/external cooling-switching milling minimum-quantity-lubrication intelligent nozzle system according to claim 1, wherein the reversing device comprises a reversing base, a reversing channel is arranged inside the reversing base, an inlet of the reversing channel is butted with the cutting fluid supply source through a pipeline, a first outlet of the reversing channel communicates with the internal cooling system, a second outlet of the reversing channel communicates with the external cooling system, a reversing block is mounted in the reversing channel, and the reversing block is capable of blocking the first outlet and/or the second outlet by rotation.

4. The internal cooling/external cooling-switching milling minimum-quantity-lubrication intelligent nozzle system according to claim 3, wherein the reversing base is provided with a pressure regulating structure and a pressure relieving structure, and both the pressure regulating structure and the pressure relieving structure communicate with the reversing channel.

5. The internal cooling/external cooling-switching milling minimum-quantity-lubrication intelligent nozzle system according to claim 1, wherein the external cooling system comprises the nozzle device, a telescopic arm module and a nozzle angle module, the nozzle device is mounted on the telescopic arm module through the nozzle angle module, and the nozzle device is capable of changing a relative position to the workpiece through the telescopic arm module and changing a direction of an output end of the nozzle device through the nozzle angle module.

6. The internal cooling/external cooling-switching milling minimum-quantity-lubrication intelligent nozzle system according to claim 5, wherein the telescopic arm module comprises a telescopic arm support, an X-axis action arm, a Y-axis action arm and a Z-axis action arm, the X-axis action arm is mounted on the telescopic arm support through the Z-axis action arm, the Y-axis action arm is mounted on the telescopic arm support, and the nozzle angle module is mounted at an output end of the Y-axis action arm by magnetic force.

7. The internal cooling/external cooling-switching milling minimum-quantity-lubrication intelligent nozzle system according to claim 5, wherein the nozzle device comprises a gas pipe, a liquid pipe and a gas-liquid pipe, one end of the gas pipe communicates with a gas source, the other end communicates with the gas-liquid pipe with an axis forming a set included angle with an axis of the gas-liquid pipe, one end of the liquid pipe communicates with the cutting fluid supply source through the reversing device, the other end is coaxially butted with the gas-liquid pipe, a gas-liquid mixing cavity is formed inside the gas-liquid pipe, and the gas-liquid mixing cavity communicates with the outside through an opening at one end of the gas-liquid pipe away from the liquid pipe.

8. The internal cooling/external cooling-switching milling minimum-quantity-lubrication intelligent nozzle system according to claim 5, wherein the nozzle angle module comprises a first rotation module and a second rotation module, the nozzle device is mounted at an output end of the second rotation module, the second rotation module is mounted at an output end of the first rotation module, and the nozzle angle module is configured to change the direction of the output end of the nozzle device.

9. An internal cooling/external cooling-switching milling minimum-quantity-lubrication method using the internal cooling/external cooling-switching milling minimum-quantity-lubrication intelligent nozzle system according to claim 1, comprising the following steps:

acquiring, by the vision system, a real-time milling depth image of a workpiece and transmitting the real-time milling depth image to the lubrication manner controller for processing;

determining a lubrication manner under current conditions and controlling the reversing device to act according to a set milling depth threshold of the lubrication manner controller to make the internal cooling system or the external cooling system work;

delivering, by the internal cooling system, a lubricating fluid to the internal cooling pipe of the cutting tool for cyclic heat transfer to realize cooling and lubrication; and mixing, by the external cooling system, the lubricating fluid with a gas, and spraying the mixture to a machining position of the workpiece through the nozzle device to realize cooling and lubrication.

10. The internal cooling/external cooling-switching milling minimum-quantity-lubrication method according to claim 9, wherein droplets output from the external cooling system impact a heat source surface and spread to form a liquid film along the heat source surface to perform heat transfer on the heat source surface.

* * * * *